US009661638B2

(12) United States Patent
Rebeiz et al.

(10) Patent No.: US 9,661,638 B2
(45) Date of Patent: May 23, 2017

(54) METHODS AND APPARATUS FOR SIGNALING USER ALLOCATIONS IN MULTI-USER WIRELESS COMMUNICATION NETWORKS

(71) Applicant: QUALCOMM Incorporated, San Diego, CA (US)

(72) Inventors: Eric Pierre Rebeiz, Santa Clara, CA (US); Rahul Tandra, San Diego, CA (US); Sameer Vermani, San Diego, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 111 days.

(21) Appl. No.: 14/704,878

(22) Filed: May 5, 2015

(65) Prior Publication Data
US 2015/0327276 A1 Nov. 12, 2015

Related U.S. Application Data

(60) Provisional application No. 61/989,992, filed on May 7, 2014, provisional application No. 62/020,243, filed
(Continued)

(51) Int. Cl.
H04W 72/04 (2009.01)
H04W 72/12 (2009.01)
H04W 84/12 (2009.01)

(52) U.S. Cl.
CPC ... *H04W 72/0493* (2013.01); *H04W 72/0486* (2013.01); *H04W 72/1289* (2013.01); *H04W 84/12* (2013.01)

(58) Field of Classification Search
CPC ......... H04W 72/0493; H04W 72/0486; H04W 72/1289; H04W 84/12
See application file for complete search history.

(56) References Cited

U.S. PATENT DOCUMENTS 9,167,476 B2 * 10/2015 Kim ..................... H04W 4/06
9,397,785 B1 * 7/2016 Zhang .................. H04L 1/0061
(Continued)

OTHER PUBLICATIONS

Hart B., "DL-OFDMA-for-Mixed-Clients; 11-10-0317-01-00AC-DL-ofdma-FOR-mixed-clients",IEEE DR FT; 11-10-0317-01-00AC-DL-OFDMA-FOR-MIXED-CLIENTS, IEE-SA MENTOR, Piscataway, NJ USA, vol. 802.11ac, No. 1, Mar. 16, 2010 (Mar. 16, 2010), pp. 1-24, XP017677327, [retrieved on Mar. 16, 2010].
(Continued)

Primary Examiner — Duc C Ho
(74) Attorney, Agent, or Firm — Knobbe, Martens, Olson & Bear, LLP

(57) ABSTRACT

A method for high efficiency wireless communication is provided. In one aspect, a method of high efficiency wireless communication includes generating, at an access point, a message for transmission over at least one channel. The message includes a first signal field indicative of a length of the first message after the first signal field. The message further includes a second signal field indicative of at least one channel assignment. The second signal field has a length based on a minimum allocation size. The method further includes transmitting the message to one or more wireless devices.

28 Claims, 19 Drawing Sheets

Related U.S. Application Data on Jul. 2, 2014, provisional application No. 62/141,593, filed on Apr. 1, 2015.

(56) References Cited

U.S. PATENT DOCUMENTS

| | | | |
|---|---|---|---|
| 2012/0263160 A1* | 10/2012 | Choi | H04L 1/0083 370/338 |
| 2013/0128831 A1 | 5/2013 | Calcev et al. | |
| 2013/0235773 A1 | 9/2013 | Wang et al. | |
| 2015/0319782 A1* | 11/2015 | Chu | H04W 74/08 370/336 |
| 2016/0156750 A1* | 6/2016 | Zhang | H04W 28/06 370/338 |

OTHER PUBLICATIONS

International Search Report and Written Opinion—PCT/US2015/029502—ISA/EPO—Jul. 15, 2015.
Wong E. et al., "Proposed TGah Draft Amendment"; IEEE P802.11 Wireless LANs; IEEE-SA MENTOR, Piscataway, NJ USA, doc. IEEE 802.11-13/0500R0, May 10, 2013 (May 10, 2013), pp. 1-330, XP068054010.

\* cited by examiner

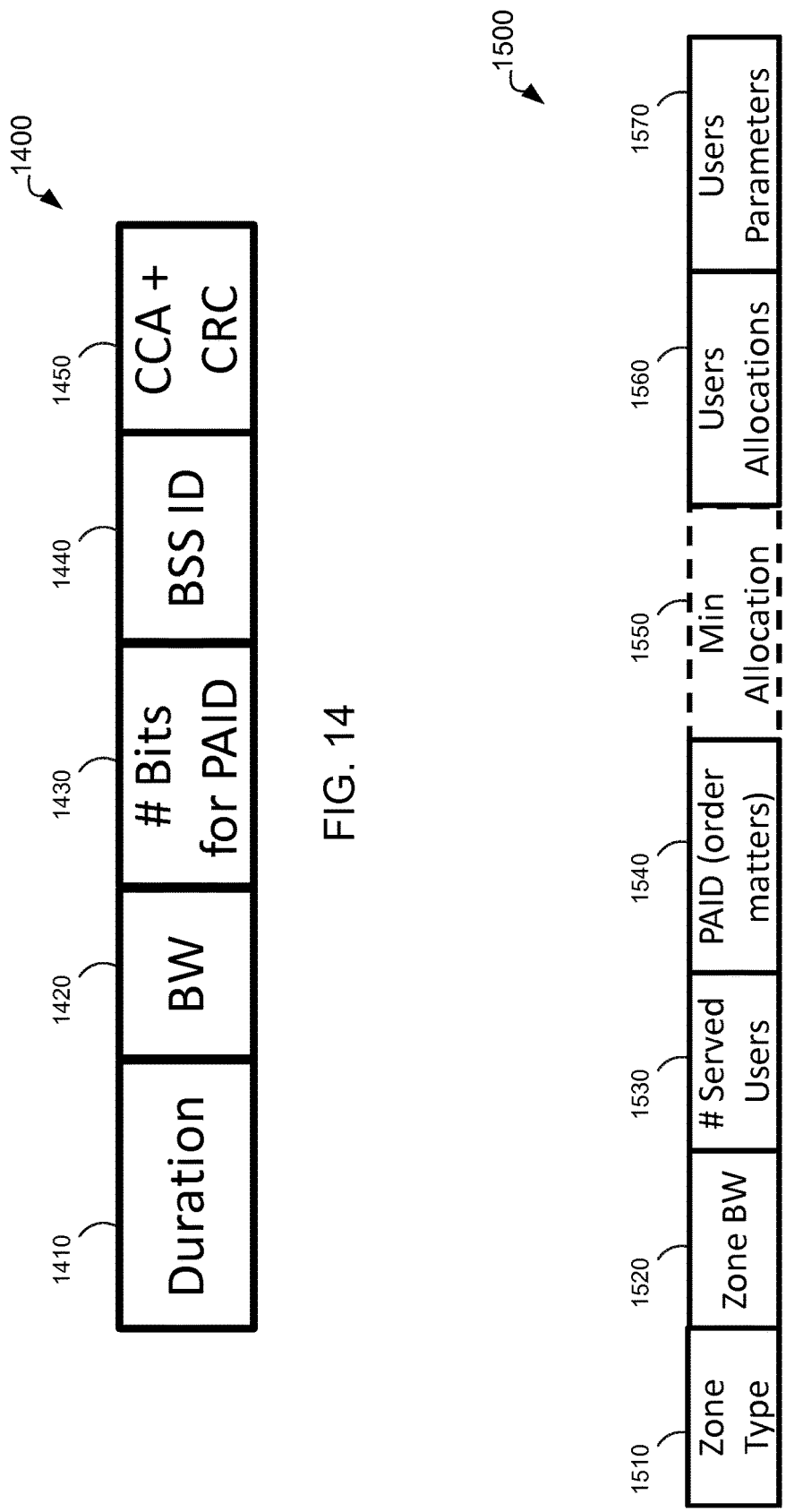

N = number of users served in this 20 MHz

| N = # Users | Fixed Min allocation = 5 MHz | Fixed Min allocation = 2.5 MHz | Dynamic Min Allocation |
|---|---|---|---|
| HE-SIG1 1500 | $2+(N-1)\log_2(4) = 2N$ (2 bits to specify # users) | $2+(N-1)\log_2(8) = 3N-1$ | $4 + (N-1)(\lceil\log_2(20/\min_{alloc})\rceil)$ (2 bits to specify # users 2 bits to specify min alloc) |
| HE-SIG1 1600 | 4 bits | 8 bits | 2 + 20/min alloc |

| Number of Users | HE-SIG1 1500 | HE-SIG1 1600 | HE-SIG1 1500 | HE-SIG1 1600 | HE-SIG1 1500 Min All = 2.5 MHz | HE-SIG1 1600 Min All = 2.5 MHz |
|---|---|---|---|---|---|---|
| 2 | 4 | 4 | 5 | 8 | 7 | 10 |
| 3 | 6 | 4 | 7 | 8 | 9 | 10 |
| 4 | 8 | 4 | 11 | 8 | 13 | 10 |

FIG. 17

N = number of users served in this zone; as illustrated a zone bandwidth of 60 MHz

| N = # Users | Fixed Min allocation = 5 MHz | Fixed Min allocation = 2.5 MHz | Dynamic Min Allocation |
|---|---|---|---|
| HE-SIG1 1500 | $2+(N-1)\lceil \log_2(12)\rceil = 4N-2$ <br> (2 bits to specify # users) | $2+(N-1)\lceil \log_2(24)\rceil = 5N-3$ | $4+(N-1)(\lceil\log_2(\frac{60}{\min_{alloc}})\rceil)$ <br> (2 bits to specify # users <br> 2 bits to specify min alloc) |
| HE-SIG1 1600 | 12 bits | 24 bits | 2 + 60/min alloc |

| Number of Users | HE-SIG1 1500 | HE-SIG1 1600 | HE-SIG1 1500 | HE-SIG1 1600 | HE-SIG1 1500 <br> Min All = 2.5 MHz | HE-SIG1 1600 <br> Min All = 2.5 MHz |
|---|---|---|---|---|---|---|
| 2 | 6 | 12 | 7 | 24 | 9 | 26 |
| 3 | 10 | 12 | 12 | 24 | 14 | 26 |
| 4 | 14 | 12 | 17 | 24 | 19 | 26 |

FIG. 18

METHODS AND APPARATUS FOR
SIGNALING USER ALLOCATIONS IN
MULTI-USER WIRELESS COMMUNICATION
NETWORKS

CROSS-REFERENCE TO RELATED
APPLICATIONS

This application claims benefit under 35 U.S.C. §119(e) to U.S. Provisional Patent Application No. 61/989,992, entitled "METHODS AND APPARATUS FOR SIGNALING USER ALLOCATIONS IN MULTI-USER WIRELESS COMMUNICATION NETWORKS," filed on May 7, 2014; U.S. Provisional Patent Application No. 62/020,243, entitled "METHODS AND APPARATUS FOR SIGNALING USER ALLOCATIONS IN MULTI-USER WIRELESS COMMUNICATION NETWORKS," filed on Jul. 2, 2014; U.S. Provisional Patent Application No. 62/141,593, entitled "METHODS AND APPARATUS FOR SIGNALING USER ALLOCATIONS IN MULTI-USER WIRELESS COMMUNICATION NETWORKS," filed on Apr. 1, 2015; the disclosure of each of which is hereby incorporated by reference in its entirety.

FIELD

Certain aspects of the present disclosure generally relate to wireless communications, and more particularly, to methods and apparatus for wireless communication utilizing efficient signal field design in high efficiency wireless (HEW) packets.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. For example, when an access point sends downlink communications to multiple terminals, it is desirable to minimize the number of bits required to control the downlink of all transmissions. Thus, there is a need for an improved protocol for transmissions to and from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect of the present disclosure provides a method of wireless communication. The method includes generating, at an access point, a message for transmission over at least one channel. The message includes a first signal field indicative of a length of the first message after the first signal field. The message further includes a second signal field indicative of at least one channel assignment. The second signal field can have variable length, which can be indicated either explicitly or implicitly through several techniques. For example, it can be encoded in the first signal field. The method further includes transmitting the message to one or more wireless devices.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the method can further include determining a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides an apparatus configured for wireless communication. The apparatus includes a processor configured to generate a message for transmission over at least one channel. The message includes a first signal field indicative of a length of the first message after the first signal field. The message further includes a second signal field indicative of at least one channel assignment. The second signal field can have variable length, which can be indicated either explicitly or implicitly through several techniques. For example, it can be encoded in the first signal field. The apparatus further includes a transmitter configured to transmit the message to one or more wireless devices.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the processor can be further configured to determine a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides an apparatus for wireless communication. The apparatus includes means for generating a message for transmission over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The apparatus further includes means for transmitting the message to one or more wireless devices.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the apparatus can further include means for determining a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides a non-transitory computer-readable medium. The medium includes code that, when executed, causes an apparatus to generate a message for transmission over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The medium further includes code that, when executed, causes the apparatus to transmit the message to one or more wireless devices.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the medium can further include code that, when executed, causes the apparatus to determine a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides another method of wireless communication. The method includes receiving, at a wireless device, a message for transmission over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The method further includes determining a channel assignment based on the message.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the method can further include determining a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides another apparatus configured for wireless communication. The apparatus includes a receiver configured to receive a message for transmission over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The apparatus further includes a processor configured to determine a channel assignment based on the message.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the processor can be further configured to determine a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides another apparatus for wireless communication. The apparatus includes means for receiving a message for transmission over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The apparatus further includes means for determining a channel assignment based on the message.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the apparatus can further include means for determining a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

Another aspect provides another non-transitory computer-readable medium. The medium includes code that, when executed, causes an apparatus to receive a message over at least one channel. The message includes a first signal field indicative of a length of the first message after the first signal field. The message further includes a second signal field indicative of at least one channel assignment, the second signal field having a variable length. The second signal field can have variable length, which can be indicated either explicitly or implicitly through several techniques. For example, it can be encoded in the first signal field. The medium further includes code that, when executed, causes the apparatus to determine a channel assignment based on the message.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. In various embodiments, the second signal field can include one or more of: a zone type, a zone bandwidth, a number of stations served, list of station identifiers, and a minimum allocation size. In various embodiments, the medium can further include code that, when executed, causes the apparatus to determine a fixed minimum allocation size.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap.

One aspect of the present disclosure provides a method of wirelessly communicating a packet including a first portion for transmission over at least one channel of a first transmission type and a second portion for transmission over at least one channel of a second transmission type. The method includes generating, at an access point, a first signal field indicative of at least a channel assignment to the first transmission type. The method further includes generating a second signal field indicative of at least a channel assignment to the second transmission type. The method further includes transmitting, together, the first signal field duplicated over each channel of the first transmission type, and the second signal field duplicated over each channel of the second transmission type.

In various embodiments, the first transmission type can include orthogonal frequency division multiple access (OFDMA) and the second transmission type can include multiple-user multiple-input multiple-output (MU-MIMO). In various embodiments, the first transmission type can include orthogonal frequency division multiple access (OFDMA) and the second transmission type can include OFDMA. In various embodiments, the first transmission type can include multiple-user multiple-input multiple-output (MU-MIMO) and the second transmission type can include MU-MIMO.

In various embodiments, the method can further include generating a third signal field indicative of a length of the first signal field. The method can further include transmitting the third signal field, duplicated over each channel of the first transmission type and over each channel of the second transmission type, preceding the first signal field and the second signal field.

In various embodiments, the packet can include no more than two zones. In various embodiments, the packet can include no more than a single zone, wherein the first technology type and the second technology type comprise the same technology type. In various embodiments, at least one channel assignment can include one or more of: one or more association identifications, one or more partial association identifications, and one or more group identifications.

In various embodiments, the method can further include determining the channel assignments based on a clear channel assessment. In various embodiments, the method can further include assigning at least one wireless device to multiple channels, of the same transmission type, forming a zone.

In various embodiments, at least one of the first signal field and the second signal field includes an indication of orthogonal frequency division multiple access (OFDMA) allocation unit size. In various embodiments, an orthogonal frequency division multiple access (OFDMA) allocation unit size is implicitly based on a bandwidth of an OFDMA zone.

Another aspect provides a device configured to wirelessly communicate a packet including a first portion for transmission over at least one channel of a first transmission type and a second portion for transmission over at least one channel of a second transmission type. The device includes a processor configured to generate a first signal field indicative of at least a channel assignment to the first transmission type. The processor is further configured to generate a second signal field indicative of at least a channel assignment to the second transmission type. The device further includes a transmitter configured to transmit, together, the first signal field duplicated over each channel of the first transmission type, and the second signal field duplicated over each channel of the second transmission type.

In various embodiments, the first transmission type can include orthogonal frequency division multiple access (OFDMA) and the second transmission type can include multiple-user multiple-input multiple-output (MU-MIMO). In various embodiments, the first transmission type can include orthogonal frequency division multiple access (OFDMA) and the second transmission type can include OFDMA. In various embodiments, the first transmission type can include multiple-user multiple-input multiple-output (MU-MIMO) and the second transmission type can include MU-MIMO.

In various embodiments, the processor can be further configured to generate a third signal field indicative of a length of the first signal field. The transmitter can be further configured to transmit the third signal field, duplicated over each channel of the first transmission type and over each channel of the second transmission type, preceding the first signal field and the second signal field.

In various embodiments, the packet can include no more than two zones. In various embodiments, the packet can include no more than a single zone, wherein the first technology type and the second technology type comprise the same technology type. In various embodiments, at least one channel assignment can include one or more of: one or more association identifications, one or more partial association identifications, and one or more group identifications.

In various embodiments, the processor can be further configured to determine the channel assignments based on a clear channel assessment. In various embodiments, the processor can be further configured to assign at least one wireless device to multiple channels, of the same transmission type, forming a zone.

In various embodiments, at least one of the first signal field and the second signal field includes an indication of orthogonal frequency division multiple access (OFDMA) allocation unit size. In various embodiments, an orthogonal frequency division multiple access (OFDMA) allocation unit size is implicitly based on a bandwidth of an OFDMA zone.

Another aspect provides an apparatus for wirelessly communicating a packet including a first portion for transmission over at least one channel of a first transmission type and a second portion for transmission over at least one channel of a second transmission type. The apparatus includes means for generating, at an access point, a first signal field indicative of at least a channel assignment to the first transmission type. The apparatus further includes means for generating a second signal field indicative of at least a channel assignment to the second transmission type. The apparatus further includes means for transmitting, together, the first signal field duplicated over each channel of the first transmission type, and the second signal field duplicated over each channel of the second transmission type.

In various embodiments, the first transmission type can include orthogonal frequency division multiple access (OFDMA) and the second transmission type can include multiple-user multiple-input multiple-output (MU-MIMO). In various embodiments, the first transmission type can include orthogonal frequency division multiple access (OFDMA) and the second transmission type can include OFDMA. In various embodiments, the first transmission type can include multiple-user multiple-input multiple-output (MU-MIMO) and the second transmission type can include MU-MIMO.

In various embodiments, the apparatus can further include means for generating a third signal field indicative of a length of the first signal field. The apparatus can further include means for transmitting the third signal field, duplicated over each channel of the first transmission type and over each channel of the second transmission type, preceding the first signal field and the second signal field.

In various embodiments, the packet can include no more than two zones. In various embodiments, the packet can include no more than a single zone, wherein the first technology type and the second technology type comprise the same technology type. In various embodiments, at least one channel assignment can include one or more of: one or more association identifications, one or more partial association identifications, and one or more group identifications.

In various embodiments, the apparatus can further include means for determining the channel assignments based on a clear channel assessment. In various embodiments, the apparatus can further include means for assigning at least one wireless device to multiple channels, of the same transmission type, forming a zone.

In various embodiments, at least one of the first signal field and the second signal field includes an indication of orthogonal frequency division multiple access (OFDMA) allocation unit size. In various embodiments, an orthogonal frequency division multiple access (OFDMA) allocation unit size is implicitly based on a bandwidth of an OFDMA zone.

Another aspect provides a non-transitory computer-readable medium. The medium includes code that, when executed, causes an apparatus to generate, at an access point, a first signal field of a packet including a first portion for transmission over at least one channel of a first transmission type and a second portion for transmission over at least one channel of a second transmission type, the first signal field indicative of at least a channel assignment to the first transmission type. The medium further includes code that, when executed, causes the apparatus to generate a second signal field indicative of at least a channel assignment to the second transmission type. The medium further includes code that, when executed, causes the apparatus to transmit, together, the first signal field duplicated over each channel of the first transmission type, and the second signal field duplicated over each channel of the second transmission type.

In various embodiments, the first transmission type can include orthogonal frequency division multiple access (OFDMA) and the second transmission type can include multiple-user multiple-input multiple-output (MU-MIMO). In various embodiments, the first transmission type can include orthogonal frequency division multiple access (OFDMA) and the second transmission type can include OFDMA. In various embodiments, the first transmission type can include multiple-user multiple-input multiple-output (MU-MIMO) and the second transmission type can include MU-MIMO.

In various embodiments, the medium can further include code that, when executed, causes the apparatus to generate a third signal field indicative of a length of the first signal field. The medium can further include code that, when executed, causes the apparatus to transmit the third signal field, duplicated over each channel of the first transmission type and over each channel of the second transmission type, preceding the first signal field and the second signal field.

In various embodiments, the packet can include no more than two zones. In various embodiments, the packet can include no more than a single zone, wherein the first technology type and the second technology type comprise the same technology type. In various embodiments, at least one channel assignment can include one or more of: one or more association identifications, one or more partial association identifications, and one or more group identifications.

In various embodiments, the medium can further include code that, when executed, causes the apparatus to determine the channel assignments based on a clear channel assessment. In various embodiments, the medium can further include code that, when executed, causes the apparatus to assign at least one wireless device to multiple channels, of the same transmission type, forming a zone.

In various embodiments, at least one of the first signal field and the second signal field includes an indication of orthogonal frequency division multiple access (OFDMA) allocation unit size. In various embodiments, an orthogonal frequency division multiple access (OFDMA) allocation unit size is implicitly based on a bandwidth of an OFDMA zone.

One aspect of the present disclosure provides a method of wireless communication. The method includes generating, at an access point, a first message for transmission over a primary sub-channel. The first message includes a first signal field indicative of a length of the first message after the first signal field. The first message further includes a second signal field indicative of at least a sub-channel assignment, the second signal field having a variable length. The method further includes generating a second message for transmission over at least one non-primary sub-channel. The second message includes a third signal field indicative of a length of the second message after the third signal field plus a length of the second signal field. The second message further includes the second signal field. The method further includes transmitting the first and second messages together to one or more wireless devices.

In various embodiments, the method can further include modulating the third signal field repeated over a plurality of non-primary sub-channels. In various embodiments, the method can further include setting the length of the second signal field to a default length dependent upon a transmission channel bandwidth. In various embodiments, the length of the first message is equal to the length of the second message.

In various embodiments, the first and third signal fields each include one or more of: a duration indication, a bandwidth indication, a basic service set color identification, an uplink/downlink flag, a cyclic redundancy check, and a clear channel assessment indication.

Another aspect provides an apparatus configured to perform wireless communication. The apparatus includes a processor configured to generate a first message for transmission over a primary sub-channel. The first message includes a first signal field indicative of a length of the first message after the first signal field. The first message further includes a second signal field indicative of at least a sub-channel assignment, the second signal field having a variable length. The processor is further configured to generate a second message for transmission over at least one non-primary sub-channel. The second message includes a third signal field indicative of a length of the second message after the third signal field plus a length of the second signal field. The second message further includes the second signal field. The apparatus further includes a transmitter configured to transmit the first and second messages together to one or more wireless devices.

In various embodiments, the transmitter can be configured to modulate the third signal field repeated over a plurality of non-primary sub-channels. In various embodiments, the processor can be configured to set the length of the second signal field to a default length dependent upon a transmission channel bandwidth. In various embodiments, the length of the first message is equal to the length of the second message.

In various embodiments, the first and third signal fields each include one or more of: a duration indication, a bandwidth indication, a basic service set color identification, an uplink/downlink flag, a cyclic redundancy check, and a clear channel assessment indication.

Another aspect provides an apparatus for wireless communication. The apparatus includes means for generating a first message for transmission over a primary sub-channel. The first message includes a first signal field indicative of a length of the first message after the first signal field. The first message further includes a second signal field indicative of at least a sub-channel assignment, the second signal field having a variable length. The apparatus further includes means for generating a second message for transmission over at least one non-primary sub-channel. The second message includes a third signal field indicative of a length of the second message after the third signal field plus a length of the second signal field. The second message further includes the second signal field. The apparatus further includes means for transmitting the first and second messages together to one or more wireless devices.

In various embodiments, the apparatus can further include means for modulating the third signal field repeated over a plurality of non-primary sub-channels. In various embodiments, the apparatus can further include means for setting the length of the second signal field to a default length dependent upon a transmission channel bandwidth. In various embodiments, the length of the first message is equal to the length of the second message.

In various embodiments, the first and third signal fields each include one or more of: a duration indication, a bandwidth indication, a basic service set color identification, an uplink/downlink flag, a cyclic redundancy check, and a clear channel assessment indication.

Another aspect provides a non-transitory computer-readable medium. The medium includes code that, when executed, causes an apparatus to generate a first message for transmission over a primary sub-channel. The first message includes a first signal field indicative of a length of the first message after the first signal field. The first message further includes a second signal field indicative of at least a sub-channel assignment, the second signal field having a variable length. The medium further includes code that, when executed, causes the apparatus to generate a second message for transmission over at least one non-primary sub-channel. The second message includes a third signal field indicative of a length of the second message after the third signal field plus a length of the second signal field. The second message further includes the second signal field. The medium further includes code that, when executed, causes the apparatus to transmit the first and second messages together to one or more wireless devices.

In various embodiments, the medium can further include code that, when executed, causes the apparatus to modulate the third signal field repeated over a plurality of non-primary sub-channels. In various embodiments, the medium can further include code that, when executed, causes the apparatus to set the length of the second signal field to a default length dependent upon a transmission channel bandwidth. In various embodiments, the length of the first message is equal to the length of the second message.

In various embodiments, the first and third signal fields each include one or more of: a duration indication, a bandwidth indication, a basic service set color identification, an uplink/downlink flag, a cyclic redundancy check, and a clear channel assessment indication.

Another aspect provides another method of wireless communication. The method includes generating, at an access point, a first message for transmission over a primary sub-channel. The first message includes a first signal field indicative of a length of the first message after the first signal field. The first message further includes a second signal field indicative of at least a channel assignment. The method further includes generating a second message for transmission over at least one non-primary sub-channel. The second message includes a third signal field indicative of a length of the second message after the first signal field. The second message further includes a fourth signal field, indicative of at least a channel assignment. The method further includes transmitting the first and second messages together to one or more wireless devices.

In various embodiments, the method can further include modulating the second signal field and the fourth signal field in combination over the primary sub-channel and the at least one non-primary sub-channel. In various embodiments, the method can further include modulating the second signal field and the fourth signal field separately over different sub-channels. In various embodiments, the method can further include generating the second signal field and the fourth signal field with the same contents.

In various embodiments, the method can further include generating the second signal field and the fourth signal field with different contents. In various embodiments, the method can further include duplicating the second signal field over a plurality of sub-channels within a first zone. The method can further include duplicating the fourth signal field over a plurality of sub-channels within a second zone.

In various embodiments, the method can further include generating the second signal field indicating sub-channel assignment for a first wireless device. The method can further include generating the fourth signal field indicating sub-channel assignment for a second wireless device, different from the first wireless device.

In various embodiments, the channel assignments include one or more of: one or more association identifications, one or more partial association identifications, and one or more group identifications. In various embodiments, the method can further include determining the sub-channel assignments based on a clear channel assessment. In various embodiments, the method can further include assigning at least one wireless device to multiple sub-channels. In various embodiments, the first message can further include a fifth signal field indicative of at least a transmission mode.

Another aspect provides another apparatus configured to perform wireless communication. The apparatus includes a processor configured to generate a first message for transmission over a primary sub-channel. The first message includes a first signal field indicative of a length of the first message after the first signal field. The first message further includes a second signal field indicative of at least a channel assignment. The processor is further configured to generate a second message for transmission over at least one non-primary sub-channel. The second message includes a third signal field indicative of a length of the second message after the first signal field. The second message further includes a fourth signal field, indicative of at least a channel assignment. The apparatus further includes a transmitter configured to transmit the first and second messages together to one or more wireless devices.

In various embodiments, the transmitter can be further configured to modulate the second signal field and the fourth signal field in combination over the primary sub-channel and the at least one non-primary sub-channel. In various embodiments, the transmitter can be further configured to modulate the second signal field and the fourth signal field separately over different sub-channels. In various embodiments, the processor can be further configured to generate the second signal field and the fourth signal field with the same contents.

In various embodiments, the processor can be further configured to generate the second signal field and the fourth signal field with different contents. In various embodiments, the processor can be further configured to duplicate the second signal field over a plurality of sub-channels within a first zone. The processor can be further configured to duplicate the fourth signal field over a plurality of sub-channels within a second zone.

In various embodiments, the processor can be further configured to generate the second signal field indicating sub-channel assignment for a first wireless device. The processor can be further configured to generate the fourth signal field indicating sub-channel assignment for a second wireless device, different from the first wireless device.

In various embodiments, the channel assignments include one or more of: one or more association identifications, one or more partial association identifications, and one or more group identifications. In various embodiments, the processor can be further configured to determine the sub-channel assignments based on a clear channel assessment. In various embodiments, the processor can be further configured to assign at least one wireless device to multiple sub-channels. In various embodiments, the first message can further include a fifth signal field indicative of at least a transmission mode.

Another aspect provides another apparatus for wireless communication. The apparatus includes means for generating a first message for transmission over a primary sub-channel. The first message includes a first signal field indicative of a length of the first message after the first signal field. The first message further includes a second signal field indicative of at least a channel assignment. The apparatus further includes means for generating a second message for transmission over at least one non-primary sub-channel. The second message includes a third signal field indicative of a length of the second message after the first signal field. The second message further includes a fourth signal field, indicative of at least a channel assignment. The apparatus further includes means for transmitting the first and second messages together to one or more wireless devices.

In various embodiments, the apparatus can further include means for modulating the second signal field and the fourth signal field in combination over the primary sub-channel and the at least one non-primary sub-channel. In various embodiments, the apparatus can further include means for modulating the second signal field and the fourth signal field separately over different sub-channels. In various embodiments, the apparatus can further include means for generating the second signal field and the fourth signal field with the same contents.

In various embodiments, the apparatus can further include means for generating the second signal field and the fourth signal field with different contents. In various embodiments, the apparatus can further include means for duplicating the second signal field over a plurality of sub-channels within a first zone. The apparatus can further include means for duplicating the fourth signal field over a plurality of sub-channels within a second zone.

In various embodiments, the apparatus can further include means for generating the second signal field indicating sub-channel assignment for a first wireless device. The apparatus can further include means for generating the fourth signal field indicating sub-channel assignment for a second wireless device, different from the first wireless device.

In various embodiments, the channel assignments include one or more of: one or more association identifications, one or more partial association identifications, and one or more group identifications. In various embodiments, the apparatus can further include means for determining the sub-channel assignments based on a clear channel assessment. In various embodiments, the apparatus can further include means for assigning at least one wireless device to multiple sub-channels. In various embodiments, the first message can further include a fifth signal field indicative of at least a transmission mode.

Another aspect provides another non-transitory computer-readable medium. The medium includes code that, when executed, causes an apparatus to generate a first message for transmission over a primary sub-channel. The first message includes a first signal field indicative of a length of the first message after the first signal field. The first message further includes a second signal field indicative of at least a channel assignment. The medium further includes code that, when executed, causes the apparatus to generate a second message for transmission over at least one non-primary sub-channel. The second message includes a third signal field indicative of a length of the second message after the first signal field. The second message further includes a fourth signal field, indicative of at least a channel assignment. The medium further includes code that, when executed, causes the apparatus to transmit the first and second messages together to one or more wireless devices.

In various embodiments, the medium can further include code that, when executed, causes the apparatus to modulate the second signal field and the fourth signal field in combination over the primary sub-channel and the at least one non-primary sub-channel. In various embodiments, the medium can further include code that, when executed, causes the apparatus to modulate the second signal field and the fourth signal field separately over different sub-channels. In various embodiments, the medium can further include code that, when executed, causes the apparatus to generate the second signal field and the fourth signal field with the same contents.

In various embodiments, the medium can further include code that, when executed, causes the apparatus to generate the second signal field and the fourth signal field with different contents. In various embodiments, the medium can further include code that, when executed, causes the apparatus to duplicate the second signal field over a plurality of sub-channels within a first zone. The medium can further include code that, when executed, causes the apparatus to duplicate the fourth signal field over a plurality of sub-channels within a second zone.

In various embodiments, the medium can further include code that, when executed, causes the apparatus to generate the second signal field indicating sub-channel assignment for a first wireless device. The medium can further include code that, when executed, causes the apparatus to generate the fourth signal field indicating sub-channel assignment for a second wireless device, different from the first wireless device.

In various embodiments, the channel assignments include one or more of: one or more association identifications, one or more partial association identifications, and one or more group identifications. In various embodiments, the medium can further include code that, when executed, causes the apparatus to determine the sub-channel assignments based on a clear channel assessment.

In various embodiments, the medium can further include code that, when executed, causes the apparatus to assign at least one wireless device to multiple sub-channels. In various embodiments, the first message can further include a fifth signal field indicative of at least a transmission mode.

BRIEF DESCRIPTION OF THE DRAWINGS

FIG. 14 shows an exemplary portion of a signal field, according to one embodiment.

FIG. 15 shows an exemplary portion of a signal field, according to another embodiment.

FIGS. 17-18 show exemplary sizes of a user allocations field, according to various combinations of embodiments.

DETAILED DESCRIPTION

Figure 1:
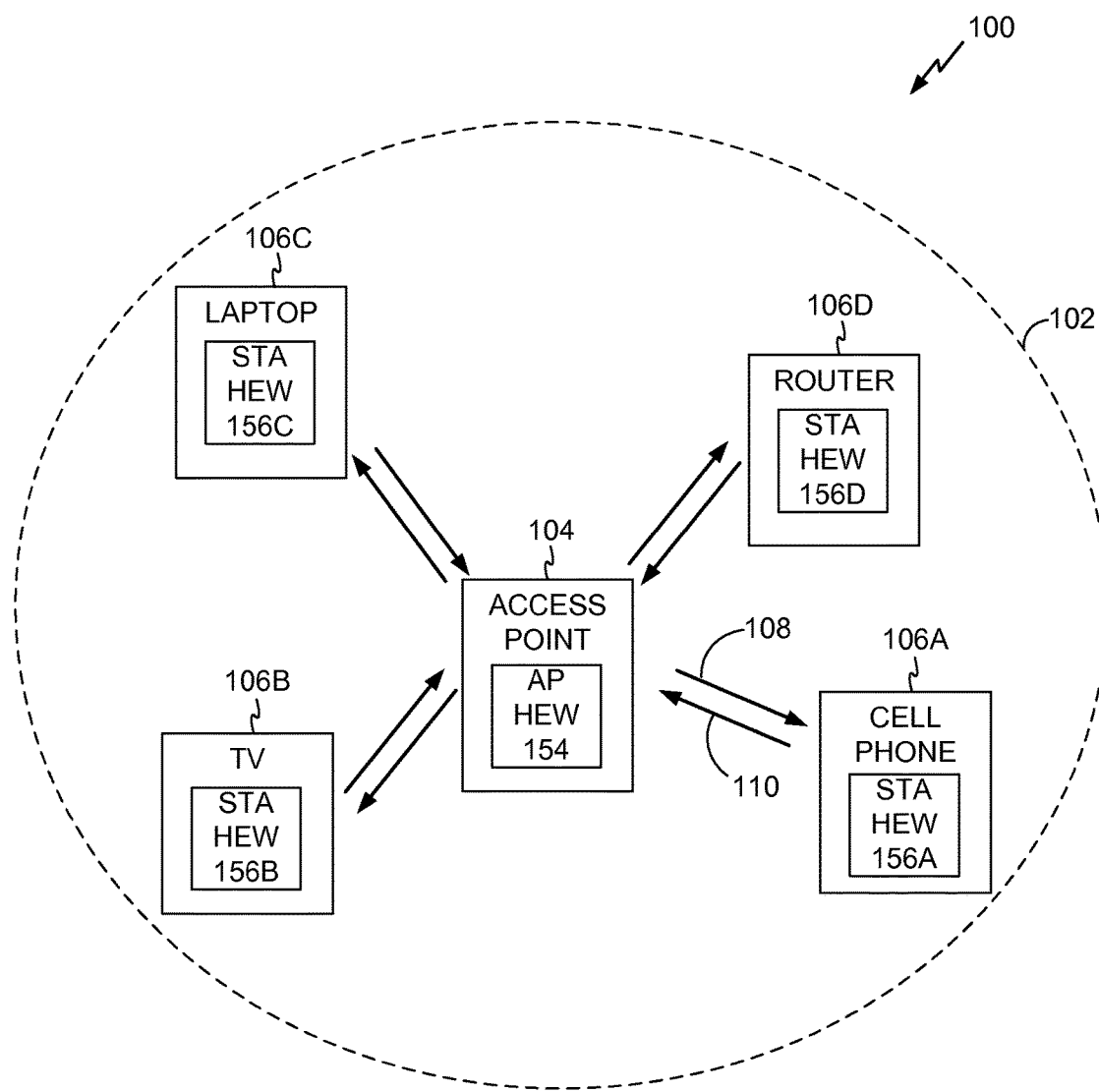
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of a IEEE 802.11 protocol, such as an 802.11 protocol which supports orthogonal frequency-division multiple access (OFDMA) communications.

It can be beneficial to allow multiple devices, such as STAs, to communicate with an AP at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex OFDM symbols to, for example, four devices at once over an 80 MHz bandwidth, where each device utilizes 20 MHz bandwidth. Thus, multiple access can be beneficial in some aspects, as it can allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can referred to as high-efficiency (HE) packets. Various structures of such packets, including backward compatible preamble fields are described in detail below.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also comprise, be implemented as, or known as a base station, wireless access point, access node or similar terminology.

A station "STA" can also comprise, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein can implement an 802.11 standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless controller (HEW) 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 4-20.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-11.

Figure 2:
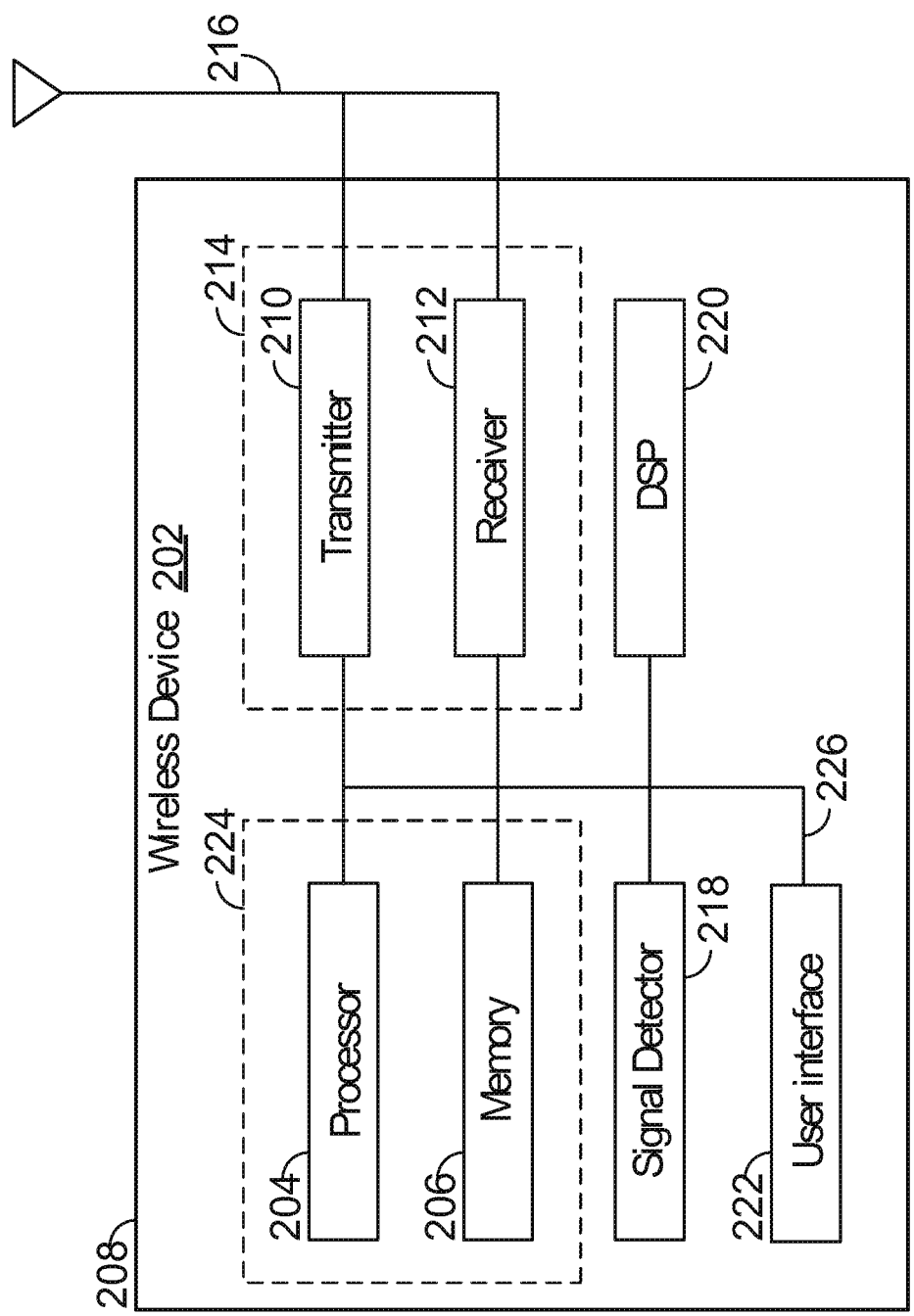
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include a processor 204 which controls operation of the wireless device 202. The processor 204 can also be referred to as a central processing unit (CPU) or hardware processor. Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 204 or the processor 204 and the memory 206 can correspond to the packet generator 124 of FIG. 1, which can be utilized to generate a packet comprising a value in a packet type field and to allocate a plurality of bits of the packet to each of a plurality of subsequent fields based at least in part on the value in the packet type field, as can be described in more detail below.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further comprise a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
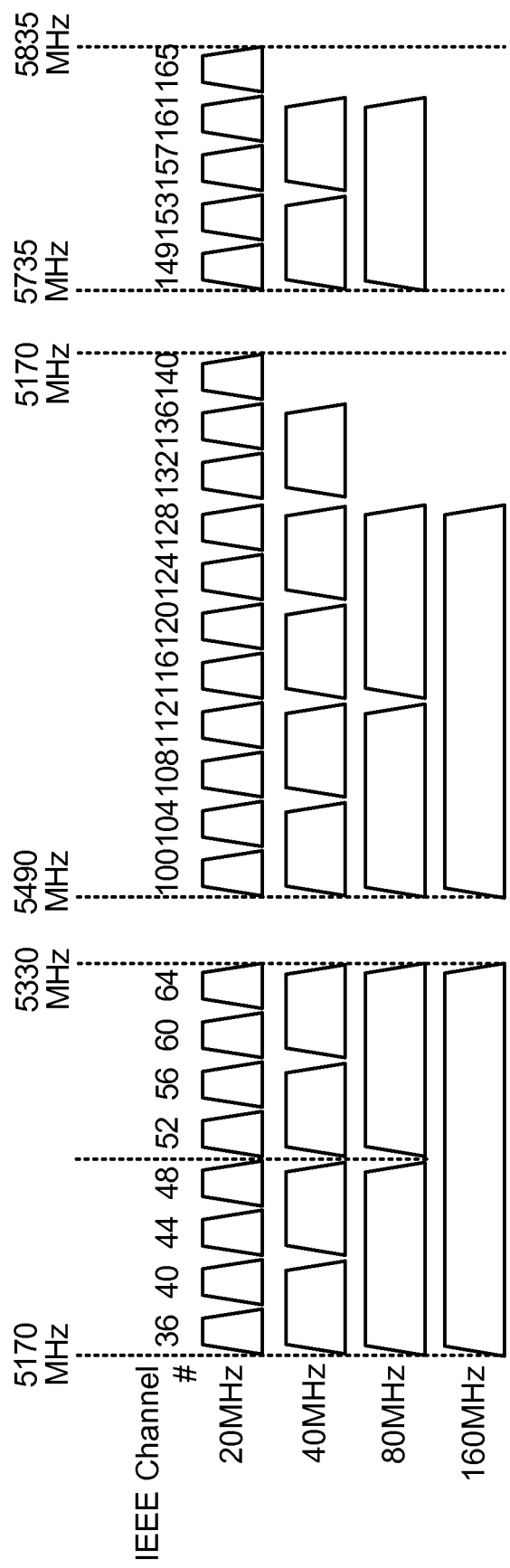
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can comprise two adjacent smaller channels. For example, an 80 MHz channel can comprise two adjacent 40 MHz channels. In the currently implemented IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −428 and 1 to 428, or 56 subcarriers. Some of these carriers can also be used to transmit pilot signals.

Figure 4:
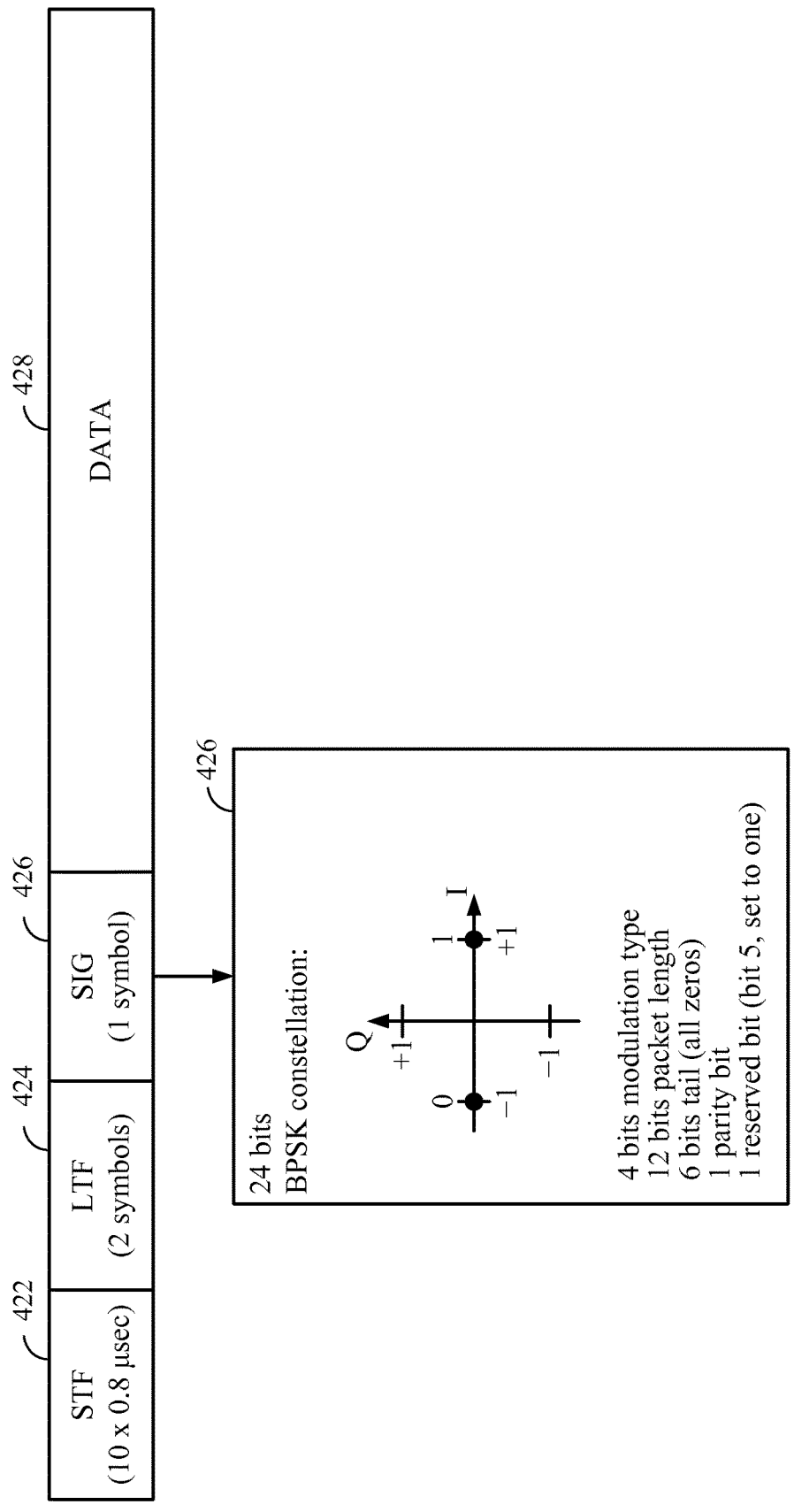
FIGS. 4 and 5 illustrate data packet formats for several currently existing IEEE 802.11 standards.
Figure 5:
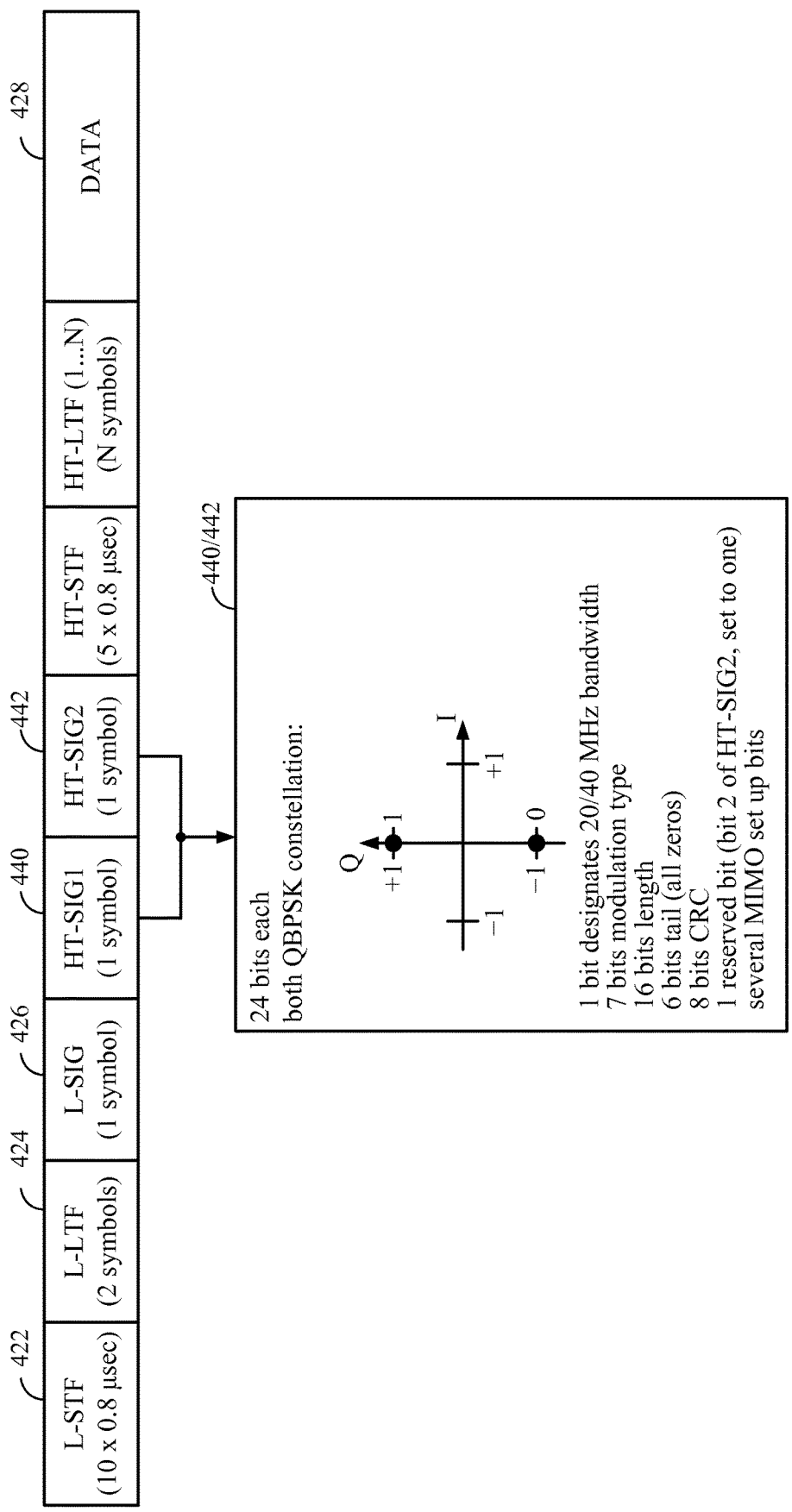

FIGS. 4 and 5 illustrate data packet formats for several currently existing IEEE 802.11 standards. Turning first to FIG. 4, a packet format for IEEE 802.11a, 11b, and 11g is illustrated. This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. In IEEE 802.11a/b/g devices, this signal field has a length of 424 bits, and is transmitted as a single OFDM symbol at a 6 Mb/s rate using BPSK modulation and a code rate of 1/2. The information in the SIG field 426 includes 4 bits describing the modulation scheme of the data in the packet (e.g., BPSK, 16QAM, 64QAM, etc.), and 12 bits for the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period of up to about 5.5 msec.

As features have been added to IEEE 802.11, changes to the format of the SIG fields in data packets were developed to provide additional information to STAs. FIG. 5 shows the packet structure for the IEEE 802.11n packet. The 11n addition to the IEEE.802.11 standard added MIMO functionality to IEEE.802.11 compatible devices. To provide backward compatibility for systems containing both IEEE 802.11a/b/g devices and IEEE 802.11n devices, the data packet for IEEE 802.11n systems also includes the STF, LTF, and SIG fields of these earlier systems, noted as L-STF 422, L-LTF 424, and L-SIG 426 with a prefix L to denote that they are "legacy" fields. To provide the needed information to STAs in an IEEE 802.11n environment, two additional signal symbols 440 and 442 were added to the IEEE 802.11n data packet. In contrast with the SIG field and L-SIG field 426, however, these signal fields used rotated BPSK modulation (also referred to as QBPSK modulation). When a legacy device configured to operate with IEEE 802.11a/b/g receives such a packet, it can receive and decode the L-SIG field 426 as a normal 11a/b/g packet. However, as the device continued decoding additional bits, they may not be decoded successfully because the format of the data packet after the L-SIG field 426 is different from the format of an 11a/b/g packet, and the CRC check performed by the device during this process can fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11a/b/g device because if it senses any modulation other than QBPSK in the symbol following the L-SIG 426, it can ignore it as an 11a/b/g packet. After the HT-SIG1 and SIG2 symbols, additional training fields suitable for MIMO communication are provided, followed by the data 428.

Figure 6:
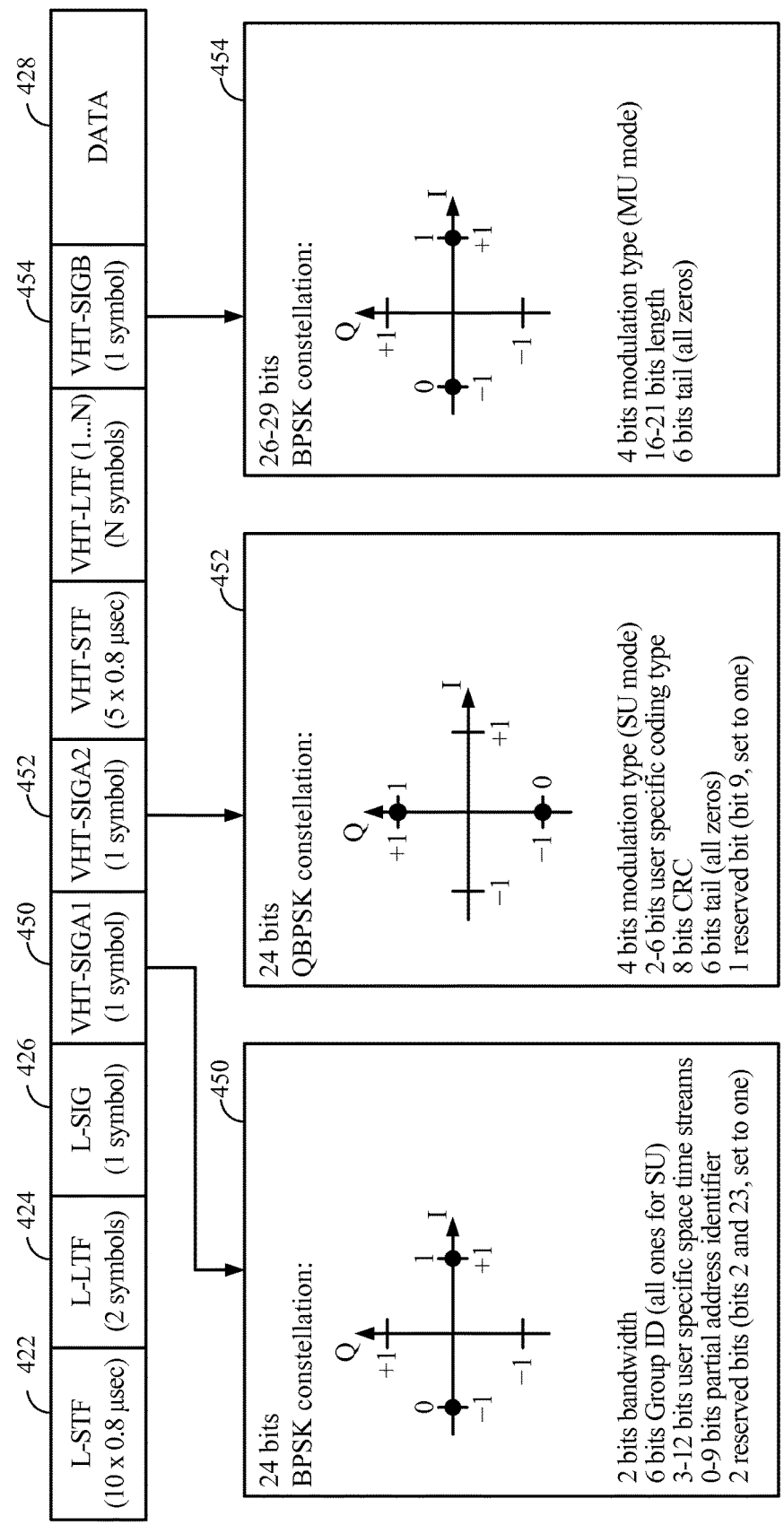
FIG. 6 illustrates a frame format for the currently existing IEEE 802.11ac standard.

FIG. 6 illustrates a frame format for the currently existing IEEE 802.11ac standard, which added multi-user MIMO functionality to the IEEE 802.11 family. Similar to IEEE 802.11n, an 802.11ac frame contains the same legacy short training field (L-STF) 422 and long training field (L-LTF) 424. An 802.11ac frame also contains a legacy signal field L-SIG 426 as described above.

Next, an 802.11ac frame includes a Very High Throughput Signal (VHT-SIG-A1 450 and A2 452) field two symbols in length. This signal field provides additional configuration information related to 11ac features that are not present in 11a/b/g and 11n devices. The first OFDM symbol 450 of the VHT-SIG-A can be modulated using BPSK, so that any 802.11n device listening to the packet can believe the packet to be an 802.11a packet, and can defer to the packet for the duration of the packet length as defined in the length field of the L-SIG 426. Devices configured according to 11a/g can be expecting a service field and MAC header following the L-SIG 426 field. When they attempt to decode this, a CRC failure can occur in a manner similar to the procedure when an 11n packet is received by an 11a/b/g device, and the 11a/b/g devices can also defer for the period defined in the L-SIG field 426. The second symbol 452 of the VHT-SIG-A is modulated with a 90-degree rotated BPSK. This rotated second symbol allows an 802.11ac device to identify the packet as an 802.11ac packet. The VHT-SIGA1 450 and A2 452 fields contain information on a bandwidth mode, modulation and coding scheme (MCS) for the single user case, number of space time streams (NSTS), and other information. The VHT-SIGA1 450 and A2 452 can also contain a number of reserved bits that are set to "1." The legacy fields and the VHT-SIGA1 and A2 fields can be duplicated over each 20 MHz of the available bandwidth.

After the VHT-SIG-A, an 802.11ac packet can contain a VHT-STF, which is configured to improve automatic gain control estimation in a multiple-input and multiple-output (MIMO) transmission. The next 1 to 8 fields of an 802.11ac packet can be VHT-LTFs. These can be used for estimating the MIMO channel and then equalizing the received signal. The number of VHT-LTFs sent can be greater than or equal to the number of spatial streams per user. Finally, the last field in the preamble before the data field is the VHT-SIG-B 454. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted Although 802.11ac introduced a variety of new features to the 802.11 family, and included a data packet with preamble design that was backward compatible with 11a/g/n devices and also provided information necessary for implementing the new features of 11ac, configuration information for OFDMA tone allocation for multiple access is not provided by the 11ac data packet design. New preamble configurations are desired to implement such features in any future version of IEEE 802.11 or any other wireless network protocol using OFDM subcarriers.

Figure 7:
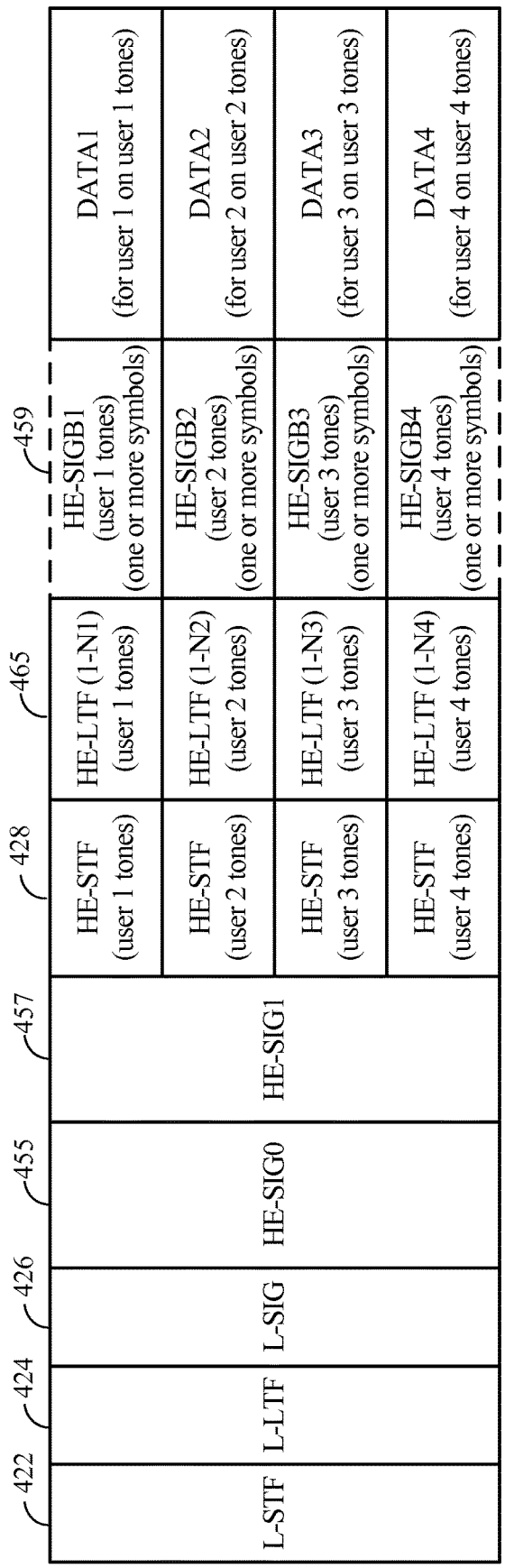
FIG. 7 illustrates an exemplary structure of a physical-layer packet which can be used to enable backward-compatible multiple access wireless communications.

FIG. 7 illustrates an exemplary structure of a physical-layer packet which can be used to enable backward-compatible multiple access wireless communications. In this example physical-layer packet, a legacy preamble including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet can include additional fields, fields can be rearranged, removed, and/or resized, and the contents of the fields varied.

This packet also contains an HE-SIG0 symbol 455, and one or more HE-SIG1 symbols 457 (which can be variable in length), and an optional HE-SIGB symbol 459 (which can be analogous to the VHT-SIGB field 454 of FIG. 4). In various embodiments, the structure of these fields can be backward compatible with IEEE 802.11a/b/g/n/ac devices, and can also signal OFDMA HE devices that the packet is an HE packet. To be backward compatible with IEEE 802.11a/b/g/n/ac devices, appropriate modulation can be used on each of these symbols. In some implementations, the HE-SIG0 field 455 can be modulated with BPSK modulation. This can have the same effect on 802.11a/b/g/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1 field 457 can be BPSK or QBPSK modulated. If BPSK modulated, an 11ac device can assume the packet is an 802.11a/b/g packet, and can stop processing the packet, and can defer for the time defined by the length field of L-SIG 426. If QBPSK modulated, an 802.11ac device can produce a CRC error during preamble processing, and can also stop processing the packet, and can defer for the time defined by the length field of L-SIG. To signal HE devices that this is an HE packet, at least the first symbol of HE-SIG1 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 7 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

One example SIG field scheme for sub-band (also referred to herein as sub-channel or channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beamformed. Beamforming this information can have certain advantages, such as allowing for more accurate decoding and/or providing more range than non-beamformed transmissions.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization.

Because different STAs can receive a different number of HE-LTFs, symbols can be transmitted from the AP 104 (FIG. 1) that contain HE-LTF information on some tones and data on other tones.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs can be interleaved. For example, if each of user-1 and user-2 receive three sub-bands, while user-4 receives two sub-bands, these sub-bands can be interleaved across the entire AP bandwidth. For example, these sub-bands can be interleaved in an order such as 1,2,4,1,2,4,1,2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based at least in part on which sub-bands the STA can have better reception. In some aspects, the sub-bands can also not be interleaved. For example, the sub-bands can instead be transmitted as 1,1,1,2,2,2,4,4. In some aspects, it can be pre-defined whether or not the sub-bands are interleaved.

In the example of FIG. 7, HE-SIG0 455 symbol modulation can be used to signal HE devices that the packet is an HE packet. Other methods of signaling HE devices that the packet is an HE packet can also be used. In the example of FIG. 7, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIGB 459 field can contain bits defining user-specific modulation type for each multiplexed user.

Referring back to FIG. 1, in various embodiments, the wireless system 100 can be configured to serve a large number of stations. As the number of stations in a wireless system 100 increases, the number of signaling bits used for tone allocation can also increase. In various embodiments, a static number of bits can be used for tone allocation. In some embodiments, the AP 104 may only send data to a small number of stations. Accordingly, tone allocation bits in a static allocation can go unused, increasing signaling overhead. Thus, efficient systems and methods for allocating tones in multi-user systems are desired. In various embodiments, a SIG field (such as the HE-SIG1 457 field of FIG. 7) can have a variable length in order to decrease signaling overhead. Systems and methods for indicating the length of the variable length SIG field are discussed herein.

Figure 8:
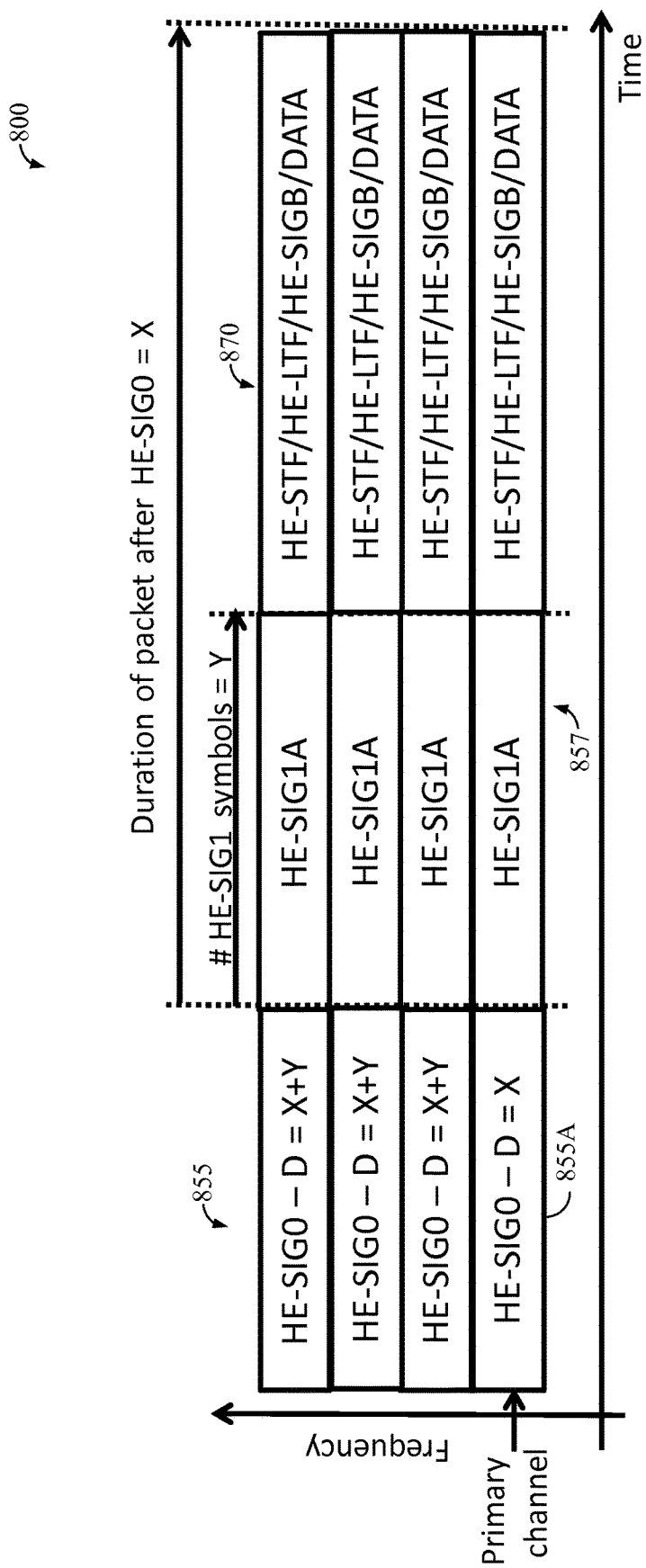
FIG. 8 illustrates a portion of an exemplary structure of another physical-layer packet, according to an embodiment.

FIG. 8 illustrates a portion of an exemplary structure of another physical-layer packet 800, according to an embodiment. As shown in FIG. 8, the packet 800 includes a plurality of HE-SIG0 fields 855, a plurality of HE-SIG1 A fields 857, and a plurality of additional fields 870, each of which can be separately modulated across frequency sub-channels. In various embodiments, the packet 800 can be similar to one or more of the packets discussed above with respect to FIGS. 4-7. For example, the HE-SIG0 fields 855 can include one or more fields discussed above with respect to the HE-SIG0 field 455 of FIG. 7, the HE-SIG1 fields 857 can include one or more fields discussed above with respect to the HE-SIG1 field 457 of FIG. 7, and the additional fields 870 can include one or more fields discussed above with respect to the HE-STF 428, HE-LTF 465, HE-SIGB 459, and data fields of FIG. 7. Although the packet 800 is described below with respect to the AP 104 and the STAs 106A-106D of the wireless system 100 of FIG. 1, the packet 800 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In the illustrated embodiment, the packet 800 can have a duration X between the end of the HE-SIG0 fields 855 and the end of the additional fields 870. In various embodiments, the duration X can include the duration of other parts of the packet 800 such as, for example, a duration between the beginning of the packet 800 and the end of the packet 800, etc. In various embodiments, the duration X can be indicated in time units (TUs), number of symbols, a multiple or fraction of seconds, etc.

The packet 800 can also have a duration Y between the end of the HE-SIG0 fields 855 and the end of the HE-SIG1 A fields 857. In various embodiments, the duration Y can include the duration of other parts of the packet 800 such as, for example, a duration between the beginning of the HE-SIG0 fields 855 and the end of the HE-SIG1 A fields 857, etc. In various embodiments, the duration Y can be indicated in time units (TUs), number of symbols, a multiple or fraction of seconds, etc.

In the illustrated embodiment, the HE-SIG0 fields 855 can be separately modulated across a plurality of frequency sub-channels. In the illustrated embodiment, the HE-SIG0 fields 855 include a duration indication D. In various embodiments, the duration indication D can indicate a duration of the packet 800 such as, for example, the duration X. In the illustrated embodiment, the duration indication D can vary across frequency sub-channels.

As shown, at least one HE-SIG0 field 855A includes a duration indication D identifying the duration X. As shown, the at least one HE-SIG0 field 855A is on the primary sub-channel, although in other embodiments, the at least one HE-SIG0 field 855A can be transmitted on one or more other channels. The remaining HE-SIG0 fields 855 include a duration indication D identifying the duration X, plus the duration Y. Accordingly, a STA 106 receiving the packet 800 across the primary sub-channel and one or more non-primary (or secondary) sub-channels can determine the duration Y by subtracting the duration D indicated on the non-primary sub-channels from the duration D indicated on the primary sub-channel. Thus, the STA 106 can determine the length of the variable-length HE-SIG1 A field 857 as Y.

In one embodiment, the AP 104 can detect that all sub-channels are clear. For example, the AP 104 can detect that all sub-channels in use are clear of strong interfering signals, over a threshold signal quality metric, pass a CCA check, etc. After detecting that all sub-channels are clear, the AP 104 can transmit the HE-SIG0 855A on the primary sub-channel, and can transmit the remaining HE-SIG0 fields 855 on the non-primary sub-channels.

The STA 106A, which can be a HEW complaint STA, can receive the HE-SIG0 855A on the primary sub-channel and can receive one or more remaining HE-SIG0 fields 855 across one or more non-primary sub-channels. In an embodiment, the STA 106A can combine the remaining HE-SIG0 fields 855 for diversity gain. Although the CRC for the HE-SIG0 fields 855 will likely fail due to the mismatch in duration indications D, the STA 106A can determine Y based on the mismatch, for example by subtracting the smaller duration from the larger duration. The STA 106A can also determine the duration X (for which the STA 106A can defer if appropriate) as the smaller of the duration indications D. In other embodiments, D, X, and Y, can have a different mathematical relationship such as, for example, subtraction, and/or can include one or more constants.

Similarly, the STA 106B, which can be a non-HEW compliant STA, can receive the HE-SIG0 855A on the primary sub-channel and can receive one or more remaining HE-SIG0 fields 855 across only one of sub-channels. Thus, the STA 106B, upon detecting the packet 800 is not compatible, can defer for the duration indication D, which can be equal to either the duration X or the duration X plus the duration Y, depending on the sub-channel over which the STA 106B receives the HE-SIG0 855. Accordingly, in some embodiments, the STA106B can continue to defer after the packet 800 is finished, for example for Y symbols after the packet 800 is finished In some embodiments, the STA 106B can combine the HE-SIG0 855 across all sub-channels. Accordingly, the CRC will likely fail. In various embodiments, the STA 106B can be configured to defer for a duration indicated in an L-SIG field when the CRC fails.

In an embodiment, the AP 104 can have a channel bandwidth of 20 MHz. In some embodiments, when the channel bandwidth is less than a threshold (such as, for example, 20 MHz), the AP 104 can set the length of the HE-SIG1 A field 857 to a default (such as, for example, 2 symbols). In some embodiments, when setting the length of the HE-SIG1 A field 857 to a default, the AP 104 can omit the additional of the duration Y to the duration indication D in the HE-SIG0 fields 855. Similarly, in some embodiments, the STAs 106A-106D can detect the channel bandwidth below the threshold and can refrain from performing a separate duration computation. Instead, the STAs 106A-106D can use the default length of the HE-SIG1 A field 857 for decoding the packet 800.

Figure 9A:
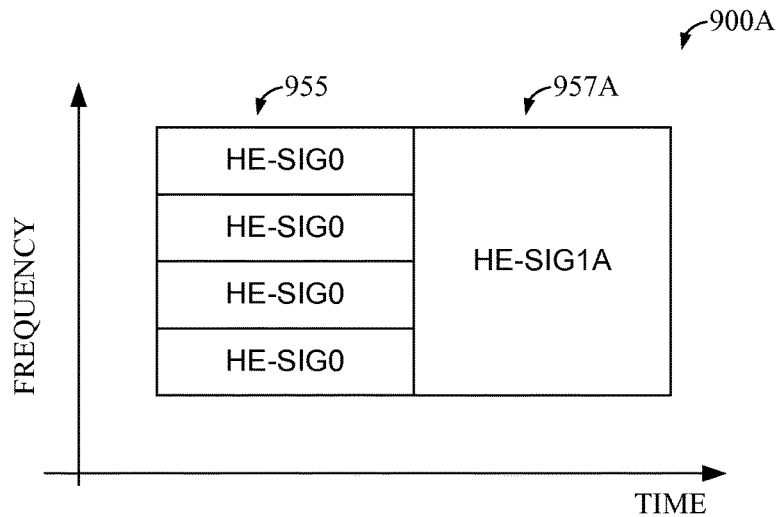
FIGS. 9A-9F illustrate portions of other exemplary structures of the physical-layer packet of FIG. 8, according to various embodiments.

FIGS. 9A-9E illustrate portions of other exemplary structures of the physical-layer packet 800 (FIG. 8), according to various embodiments. As shown in FIG. 9A, the packet 900A includes a plurality of HE-SIG0 fields 955, each of which can be separately modulated across frequency sub-channels (but the content can be repeated). The packet 900A further includes a single HE-SIG1 A field 957A that can be modulated across an entire channel (or a plurality of sub-channels). In various embodiments, the packet 900A can be similar to one or more of the packets discussed above with respect to FIGS. 4-7. For example, the HE-SIG0 fields 955 can include one or more fields discussed above with respect to the HE-SIG0 field 455 of FIG. 7, and the HE-SIG1 field 957A can include one or more fields discussed above with respect to the HE-SIG1 field 457 of FIG. 7. Although the packet 900A is described below with respect to the AP 104 and the STAs 106A-106D of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can encode and transmit the HE-SIG1 A field 957A using a common CRC across the entire channel bandwidth. Accordingly, the AP 104 can include more data bits in the same field duration, as compared to the packets 900B and 900C discussed below. In an embodiment, the STA 106A can receive and decode the HE-SIG1 A 957A across the entire channel bandwidth (or a plurality of sub-channels). In some embodiments, interference on a single sub-channel can cause the STA 106A to fail in decoding the HE-SIG1 A 957A.

Figure 9B:
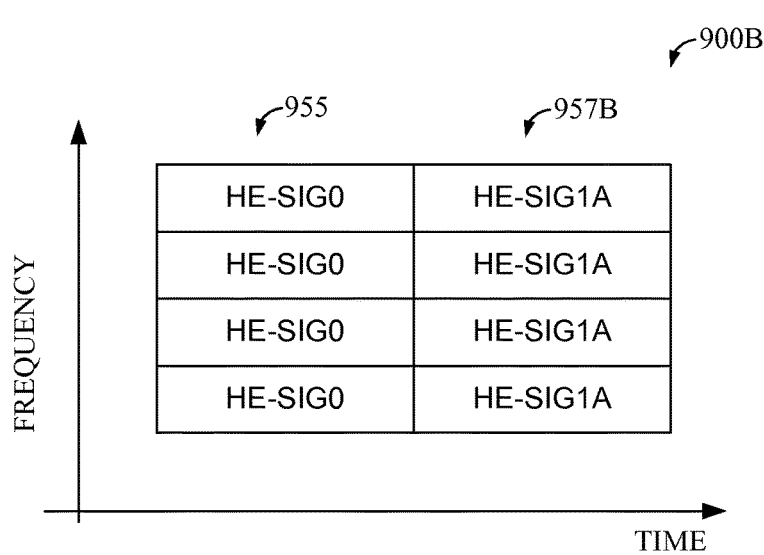

As shown in FIG. 9B, the packet 900B includes a plurality of HE-SIG0 fields 955, each of which can be separately modulated across frequency sub-channels (but the content can be repeated). The packet 900B further includes a plurality of HE-SIG1 A fields 957B each of which can be separately modulated across frequency sub-channels. In various embodiments, the packet 900B can be similar to one or more of the packets discussed above with respect to FIGS. 4-7. For example, the HE-SIG0 fields 955 can include one or more fields discussed above with respect to the HE-SIG0 field 455 of FIG. 7, and the HE-SIG1 fields 957B can include one or more fields discussed above with respect to the HE-SIG1 field 457 of FIG. 7. Although the packet 900B is described below with respect to the AP 104 and the STAs 106B-106D of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can encode and transmit the HE-SIG1 A fields 957B repeated across all sub-channels. Accordingly, the content of the HE-SIG1 A fields 957B can be the same on each sub-channel. Accordingly, the AP 104 can provide diversity gain in transmission across multiple sub-channels. In an embodiment, the STA 106B can receive, combine, and decode the HE-SIG1 A 957B fields across one or more sub-channels (or all sub-channels). In some embodiments, STAs 106 can decode information intended for other STAs 106.

Figure 9C:
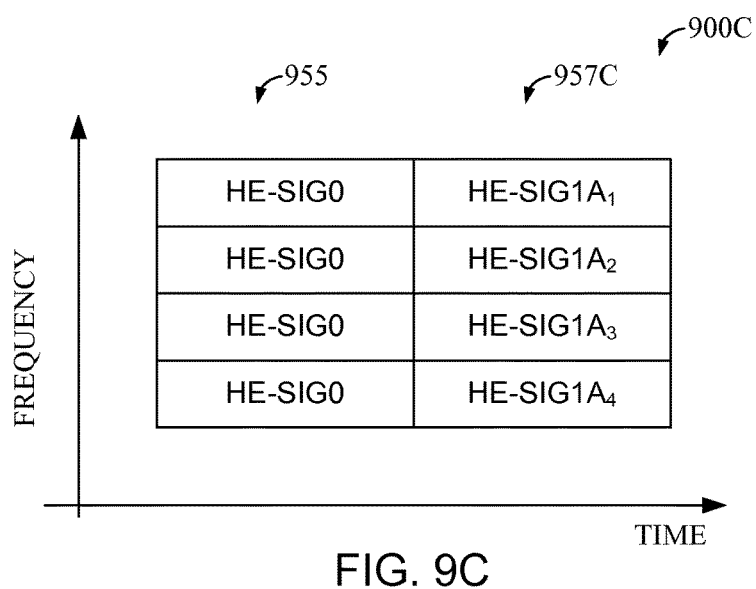

As shown in FIG. 9C, the packet 900C includes a plurality of HE-SIG0 fields 955, each of which can be separately modulated across frequency sub-channels (but the content can be repeated). The packet 900C further includes HE-SIG1 A fields 957C which can be separately modulated across frequency sub-channels. In various embodiments, the packet 900C can be similar to one or more of the packets discussed above with respect to FIGS. 4-7. For example, the HE-SIG0 fields 955 can include one or more fields discussed above with respect to the HE-SIG0 field 455 of FIG. 7, and the HE-SIG1 fields 957C can include one or more fields discussed above with respect to the HE-SIG1 field 457 of FIG. 7. Although the packet 900C is described below with respect to the AP 104 and the STAs 106C-106D of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can separately encode and transmit the HE-SIG1 A fields 957C across all sub-channels. Accordingly, the content of the HE-SIG1 A fields 957C can be different on one or more sub-channels. In various embodiments, the AP 104 can determine one or more STAs 106 on each sub-channel, and can encode information specific to each STA 106 on the corresponding sub-channel. For example, the AP 104 can encode station-specific allocations such as group identifiers (GIDs), association identifiers (AIDs), partial AIDs (PAIDs), etc. Accordingly, the AP 104 can provide less diversity gain as compared to the packet 900B discussed above. In an embodiment, the STA 106B can receive and decode the HE-SIG1 A 957B fields on a single (or plurality of) sub-channels. In some embodiments, STAs 106 can decode information on every sub-channel.

As discussed above, in various embodiments the AP 104 can encode an AID or PAID on each HE-SIG1 957C in order to identify message recipients for that sub-channel. In various embodiments, for example, each HE-SIG1 957C can include a station indication such as a 12-bit AID, a 9-bit PAID, an encoded AID (using, e.g., Huffman encoding), etc. In various embodiments, the station indication can indicate one or more STAs 106 that are recipients for an OFDMA zone. In various embodiments, there can be 4 or 8 recipients for an OFDMA zone. Accordingly, each STA 106 can determine a sub-channel allocation without the complexity of GID management.

In an embodiment, each STA 106 can decode the HE-SIG1 A 957C on all sub-channel. Each STA 106 can determine if its station indicator is indicated on each sub-channel. For sub-channels that carry a HE-SIG1 A 957C indicating the STA 106, the STA 106 can determine that those sub-channels are allocated to the STA 106. In various embodiments, the AP 104 can determine whether each sub-channel is clean to each destination STA 106, and can assign clean sub-channels using the station indications in the HE-SIG1 A 957C. In some embodiments, the AP 104 can encode a bit in each HE-SIG1 A 957C to indicate whether the sub-channel on which it is transmitted is intended for MU-MIMO or OFDMA. Similarly, the STA 106 can decode the bit in each HE-SIG1 A 957C to determine whether the sub-channel on which it is transmitted is intended for MU-MIMO or OFDMA. Additional channel allocation details are discussed below with respect to FIGS. 9D-9E.

Figure 9D:
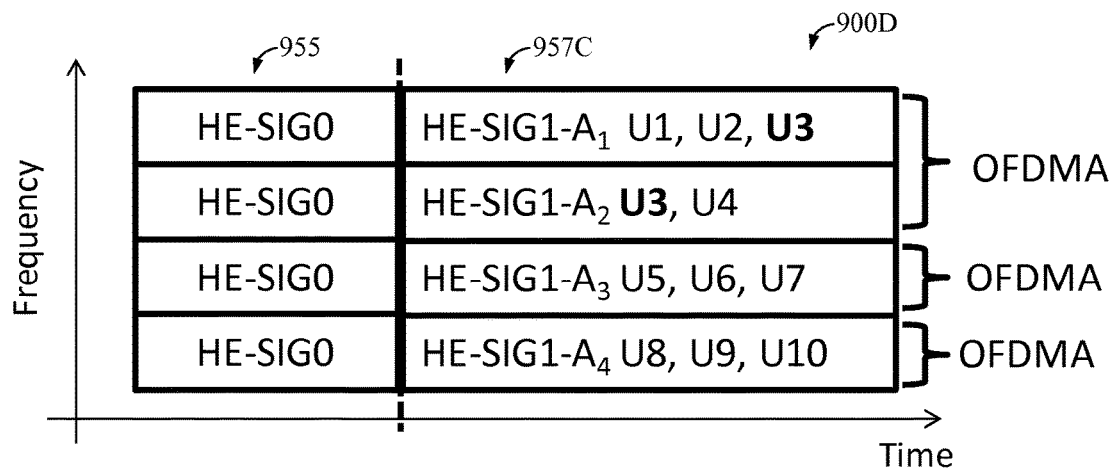

As shown in FIG. 9D, the packet 900D includes the HE-SIG0 fields 955 and the HE-SIG1 A fields 957C discussed above with respect to FIG. 9C. Although the packet 900C is described below with respect to the AP 104 and the STAs 106C-106D of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can determine one or more sub-channels for transmission to the STAs 106. For example, the AP 104 can determine that the sub-channel of HE-SIG1-$A_1$ is clear for stations U1, U2, and U3, the sub-channel of HE-SIG1-$A_2$ is clear for stations U3 and U4, the sub-channel of HE-SIG1-$A_3$ is clear for stations U5, U6, and U7, and the sub-channel of HE-SIG1-$A_4$ is clear for stations U8, U9, and U10. Accordingly, the AP 104 can encode station identifiers (such as AIDs) for U1, U2, and U3 on the HE-SIG1-$A_1$, and so on.

Moreover, the AP 104 can determine a zone bandwidth for the STAs 106, and can encode the zone bandwidth in the HE-SIG1 A fields 957C. For example, the AP 104 can determine that the station U3 can use both the sub-channel of HE-SIG1-$A_1$ and the sub-channel of HE-SIG1-$A_2$. Likewise, the station U3 can decode the HE-SIG1-$A_1$ and the HE-SIG1-$A_2$ and determine its OFDMA zone bandwidth as shown in FIG. 9D. Similarly, in embodiments including a HE-SIGB field (for example, HE-SIGB 459 of FIG. 7), the field can be combined across sub-channels for MU-MIMO transmissions, as discussed below with respect to FIG. 9E.

Figure 9E:
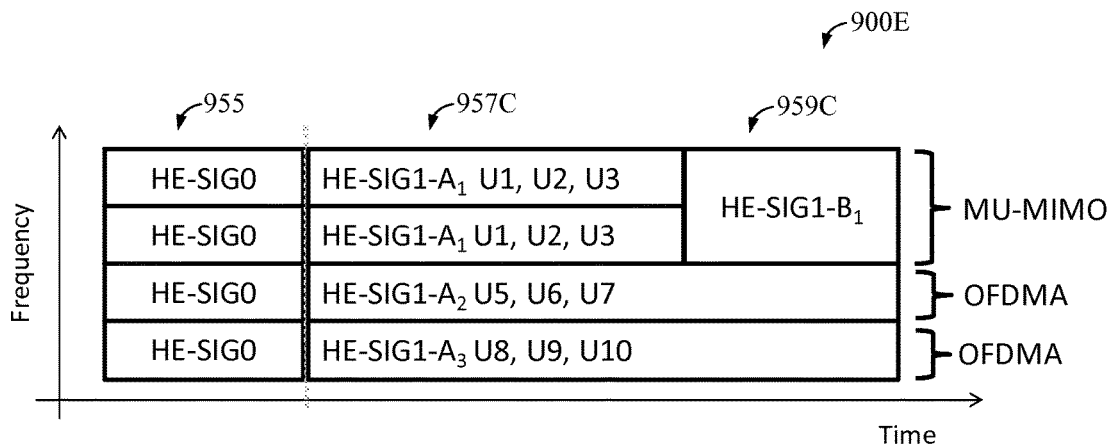

As shown in FIG. 9E, the packet 900E includes the HE-SIG0 fields 955 and the HE-SIG1 A fields 957C discussed above with respect to FIG. 9C. Although the packet 900C is described below with respect to the AP 104 and the STAs 106C-106E of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can determine one or more sub-channels for transmission to the STAs 106. For example, the AP 104 can determine that the sub-channel of HE-SIG1-$A_1$ is clear for stations U1, U2, and U3, the sub-channel of HE-SIG1-$A_2$ is clear for stations U1, U2, and U3, the sub-channel of HE-SIG1-$A_3$ is clear for stations U5, U6, and U7, and the sub-channel of HE-SIG1-$A_4$ is clear for stations U8, U9, and U10. Accordingly, the AP 104 can encode station identifiers (such as AIDs) for U1, U2, and U3 on the HE-SIG1-$A_1$, and so on.

Moreover, the AP 104 can encode the same HE-SIG1 A information over a plurality of sub-channels used for MU-MIMO. For example, in the illustrated embodiment, the top sub-channel of the HE-SIG1-$A_1$ 957C is the same as the bottom sub-channel of the HE-SIG1-$A_1$ 957C. In some embodiments, the AP 104 can encode a common HE-SIG1 B field 959C for adjacent MU-MIMO sub-channels, thereby reducing overhead. In various embodiments, the HE-SIG1 B field 959C is optional.

In some embodiments, the HE-SIG-1 A fields 957C can be repeated over each sub-band (for example, each 20 MHz) of each zone, regardless of the type of each zone. The HE-SIG-1 A fields 957C can be independent across zones (for example, across two or more MU-MIMO and/or OFDMA zones). One example of such an embodiment is illustrated in FIG. 9F.

Figure 9F:
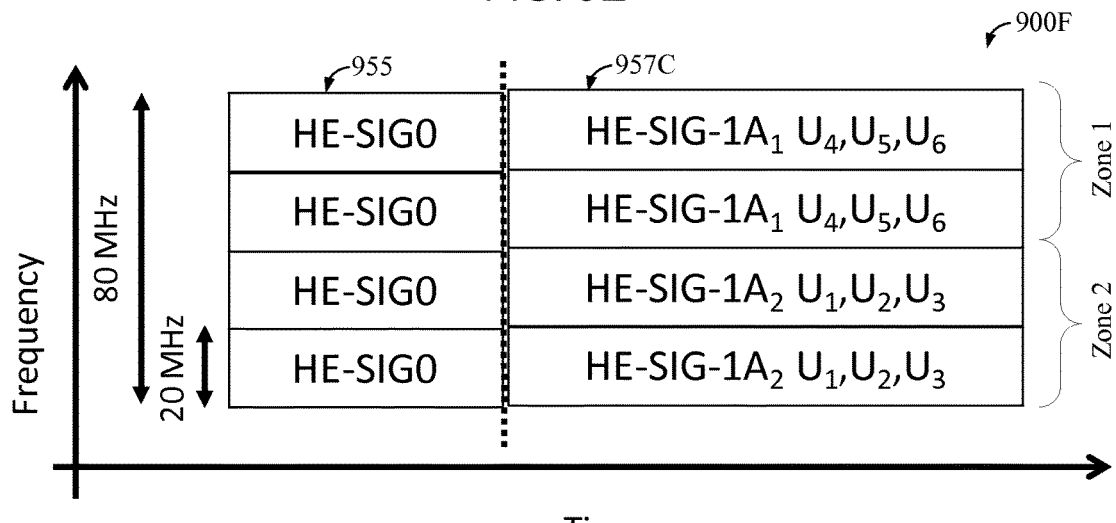

As shown in FIG. 9F, the packet 900F includes the HE-SIG0 fields 955 and the HE-SIG1 A fields 957C discussed above with respect to FIG. 9C. Although the packet 900C is described below with respect to the AP 104 and the STAs 106C-106E of the wireless system 100 of FIG. 1, the packet 900 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can determine one or more sub-channels for transmission to the STAs 106. For example, the AP 104 can determine that the sub-channels HE-SIG1-A$_1$ 957C of a first zone (Zone 1) are used to signal stations U4, U5, and U6, and that the sub-channel HE-SIG1-A$_2$ 957C of a second zone (Zone 2) are used to signal stations U1, U2, and U3. Accordingly, the AP 104 can encode station identifiers (such as AIDs) for U4, U5, and U6 on the HE-SIG1-A$_1$ 957C, and so on.

In various embodiments, the AP 104 may choose any way of partitioning the SIG information of users across the two (or more) zones. For example, in the illustrated embodiment of FIG. 9F, the AP 104 chooses to include SIG information for U1, U2, and U3 in Zone 2 and information for U4, U5, and U6 in Zone 2. However, this does not necessarily mean that U1, U2, and U3's data will be sent in the lower 40 MHz band and U4, U5, and U6's data will be sent in the upper 40 MHz band. In some embodiments, the AP 104 can partition each user's SIG information differently than their data.

Moreover, the AP 104 can encode the same HE-SIG1 A information over a plurality of sub-channels in each zone. For example, in the illustrated embodiment, the HE-SIG1-A$_1$ 957C in top 20 MHz sub-channel of Zone 1 is the same as the HE-SIG1-A$_1$ 957C in the bottom 20 MHz sub-channel of Zone 1. Similarly, the HE-SIG1-A$_2$ 957C in top 20 MHz sub-channel of Zone 2 is the same as the HE-SIG1-A$_2$ 957C in the bottom 20 MHz sub-channel of Zone 2. Although two 40 MHz zones are shown, each including two 20 MHz sub-channels, other zone sizes, sub-channel sizes, and different numbers of sub-channels per zone are contemplated within the scope of this disclosure. Moreover, the zones can be any combination of MU-MIMO and OFDMA zones. Nevertheless, in the embodiment of FIG. 9F, each HE-SIG-1 A field 957C within each zone contains the same information across sub-channels of the zone.

For consistency of discussion, various fields discussed herein are given specific names such as, for example, HE-SIG0, HE-SIG1-A, and HE-SIG1-B. It will be appreciated, however, that such fields can be referred to by other names. For example, in various embodiments, the HE-SIG0 field can be referred to as HE-SIG-B0, HE-SIG1-A can be referred to as HE-SIG-B1, and HE-SIG1-B can be referred to as HE-SIG-B2, and so on.

Figure 10:
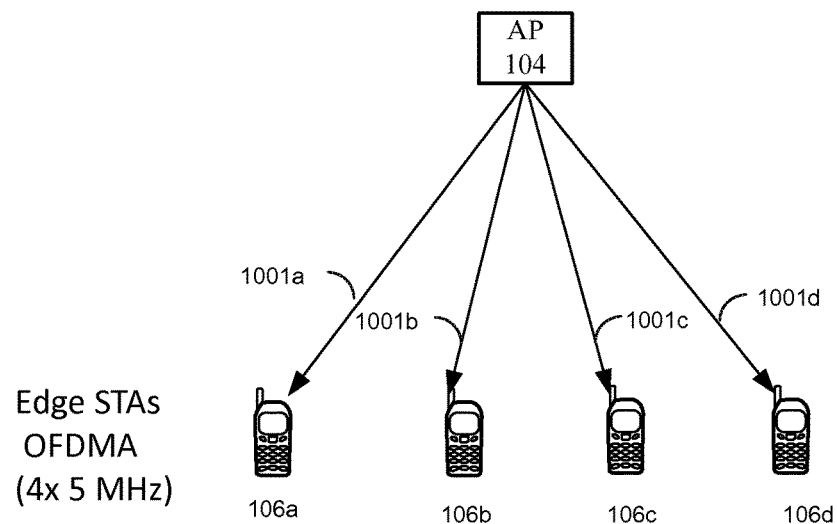
FIG. 10 is a block diagram of a wireless communications system, according to one embodiment.

FIG. 10 is a block diagram of an access point 104 and stations 106 in an OFDMA system, according to one embodiment. As shown in FIG. 10 and in conjunction with FIG. 1, the AP 104 and the STAs 106A-106D are part of an 80 MHz BSS. In the illustrated embodiment, the STAs 106A-106D are located at the edge of the BSS and have one 20 MHz channel available. The AP 104 can send the STAs 106A-106A an OFDMA transmission over the 20 MHz channels (i.e., OFDMA transmissions 301A-301D). The remaining 60 MHz bandwidth can be unavailable because of overlapping basic service set (OBSS) interference.

Figure 11:
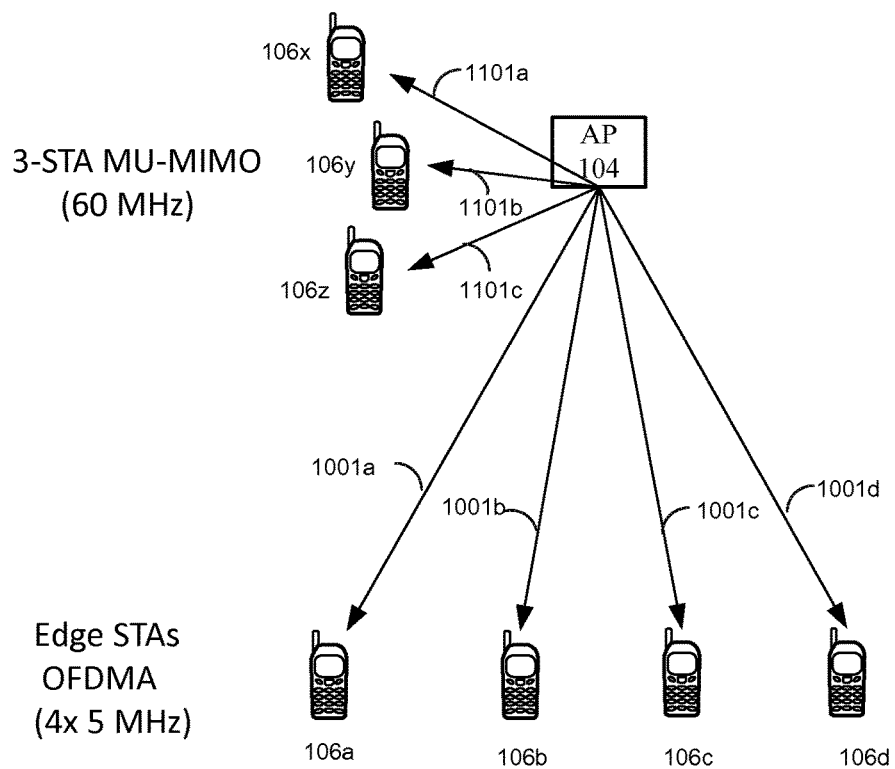
FIG. 11 is a block diagram of the in a mixed wireless communications system, according to one embodiment.

Certain aspects of the present disclosure support mixing MU-MIMO and OFDMA techniques in the frequency domain in a same PPDU. In some embodiments, a first portion of the PPDU bandwidth can be transmitted as a one of at least a MU-MIMO transmission and an OFDMA transmission. A second portion of the PPDU bandwidth can be transmitted as one of at least a MU-MIMO transmission and an OFDMA transmission. In various embodiments, each portion can be referred to as a "zone." Thus, in various embodiments, the first and second portions can include any combination such as MU-MIMO/OFDMA, MU-MIMO/MU-MIMO, OFDMA/OFDMA, and OFDMA/OFDMA. In some embodiments, the PPDU bandwidth can include more than two portions or zones. In some embodiments, the PPDU bandwidth can be limited to a single zone or a maximum of two zones. For example, FIG. 11 illustrates a two-zone configuration including MU-MIMO transmissions 1101A-1101C and OFDMA transmissions 1001A-1001D. In these embodiments, MU-MIMO or OFDMA transmissions can be sent simultaneously from an AP to multiple STAs and can create efficiencies in wireless communication.

FIG. 11 is a block diagram of the AP 104 and the STAs 106A-106D and 160X-160Z in a mixed MU-MIMO and OFDMA system, according to one embodiment. In the illustrated embodiment, the STAs 106A-106D have one 20 MHz channel that is available as in FIG. 10 and the AP 104 can send OFDMA transmissions 1001A-1001D to the STAs 106A-106D over the 20 MHz channel. In this aspect, the AP 104 can also send MU-MIMO transmissions 1101A-1101C to STAs 106X-106Z that are close to the AP 104 over the remaining 60 MHz portion of the bandwidth. By sending an MU-MIMO packet to the STAs 106X-106Z over the previously un-used 60 MHz portion of the bandwidth, the AP 104 can increase throughput by using a combination of OFDMA and MU-MIMO transmissions.

Figure 12:
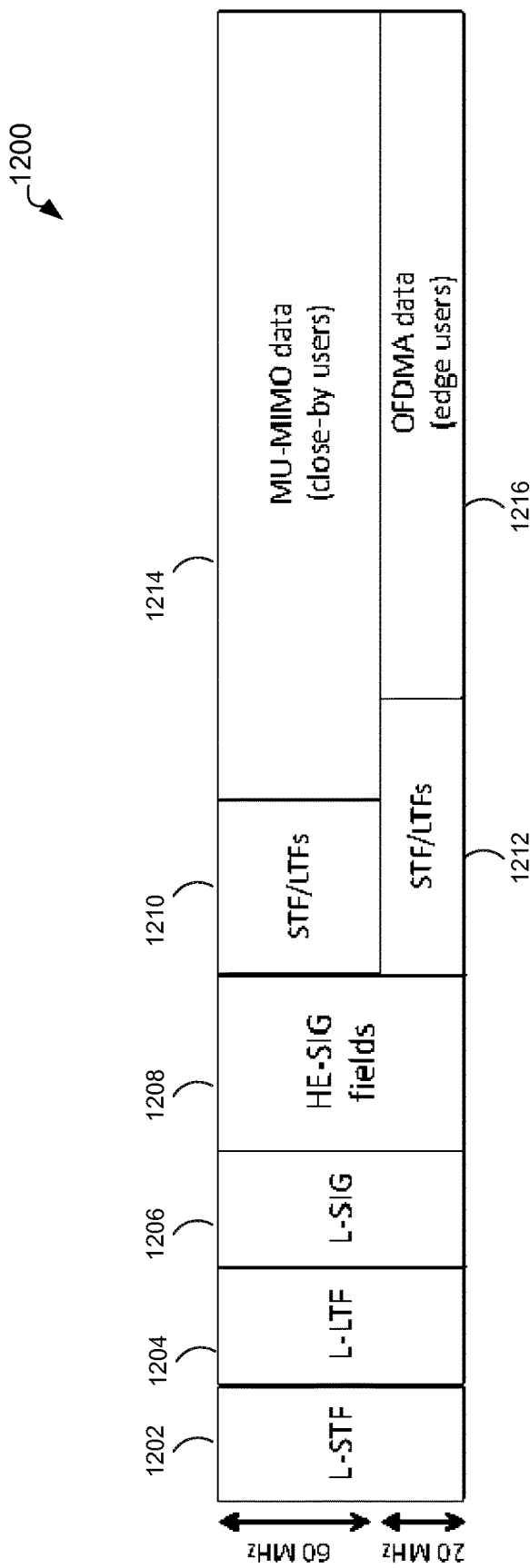
FIG. 12 is a diagram of a mixed physical layer data unit (PPDU) packet format, including OFDMA and MU-MIMO portions, according to one embodiment.

FIG. 12 is a diagram of a mixed physical layer data unit (PPDU) 1200 packet format, including OFDMA and MU-MIMO portions, according to one embodiment. Such a mixed PPDU can be transmitted by a wireless device, such as an AP 104. The PPDU 1200 can include a legacy portion, which includes legacy fields: legacy short training field (L-STF) 1202; legacy long training field (L-LTF) 1204; and legacy signal field (L-SIG) 1206. The legacy fields 1202, 1204, and 1206 can be duplicated in every 20 MHz channel.

PPDU 1200 can also include a high-efficiency signal field (HE-SIG) 1208, which contains certain signaling information for the PPDU 1200. In some embodiments, the HE-SIG 1208 can contain a bit to indicate that the PPDU 1200 contains both MU-MIMO and OFDMA portions. The HE-SIG 1208 can also contain stream allocation (for MU-MIMO STAs) and tone allocation (for OFDMA STAs) information.

As shown in FIG. 12, the MU-MIMO portion of the PPDU 1200 packet is in the top 60 MHz of the bandwidth and the MU-MIMO portion contains a STF/LTFs field 1210 and a MU-MIMO data portion 1214. The OFDMA portion of the PPDU 1200 packet is in the bottom 20 MHz of the bandwidth and contains a STF/LTFs field 1212 and a OFDMA data portion 1216. Although 20 MHz channels are illustrated, with the total bandwidth being divided between MU-MIMO and OFDMA illustrated as a 60 MHz/20 MHz split, different channel widths and splits are contemplated. For example, in some embodiments, zones can be any integer multiple number of a channel width such as 20 MHz, 40 MHz, 60 MHz, etc.

While FIG. 12 illustrates the STF/LTFs field 1212 is larger than the STF/LTFs field 1210, either field STF/LTFs 1210 or 1212 can be any size such that in some embodiments, STF/LTFs field 1210 can be larger or equal to STF/LTFs field 1212. When transmitting a PPDU 1200 packet an AP 104 can allocate part of its bandwidth to transmit the MU-MIMO portion (fields 1210 and 1214) and the remaining bandwidth can be used to transmit the OFDMA portion (fields 1212 and 1216).

As discussed in connection with FIG. 12, a HE-SIG field 1208 can signal the allocation of STAs across the MU-MIMO and OFDMA portions of the PPDU 1200 packet bandwidth. In some embodiments, the HE-SIG field 1208 can include a two-bit field to indicate the packet bandwidth. The HE-SIG field 1208 can also include a one-bit field to indicate whether the packet is a mixture of MU-MIMO and OFDMA or not. The HE-SIG field 1208 can also include a one-bit field to indicate whether the MU-MIMO portion is in the top portion of the bandwidth or not. The HE-SIG field 1208 can also include a four-bit field to indicate the bandwidth of the MU-MIMO portion of the packet. In some embodiments, the MU-MIMO portion can be anywhere from 20-160 MHz and the remaining bandwidth can be allocated for the OFDMA portion. In some embodiments, the bandwidth of the MU-MIMO and OFDMA portions of the PPDU can be multiples of 20 MHz. The HE-SIG field 1208 can also include a six-bit group identifier (GID) field to indicate the group of STAs for the MU-MIMO portion and a six-bit GID field to indicate the group of STAs for the OFDMA portion.

As discussed above, for example with respect to FIG. 1, in various embodiments, the wireless system 100 can be configured to serve a large number of stations. As the number of stations in a wireless system 100 increases, the number of signaling bits used for tone or stream allocation can also increase. In various embodiments, a static number of bits can be used for tone allocation. In some embodiments, the AP 104 may only send data to a small number of stations. Accordingly, tone allocation bits in a static allocation can go unused, increasing signaling overhead. Thus, efficient systems and methods for allocating tones in multi-zone systems are desired. In various embodiments, a SIG field (such as the HE-SIG1 A 457 field of FIG. 7) can have a variable length in order to decrease signaling overhead. For example, in various embodiments the HE-SIG fields 1208 of FIG. 12 can include HE-SIG0, HE-SIG1 A, and/or HE-SIG1 B fields, as discussed above with respect to FIG. 7.

Figure 13:
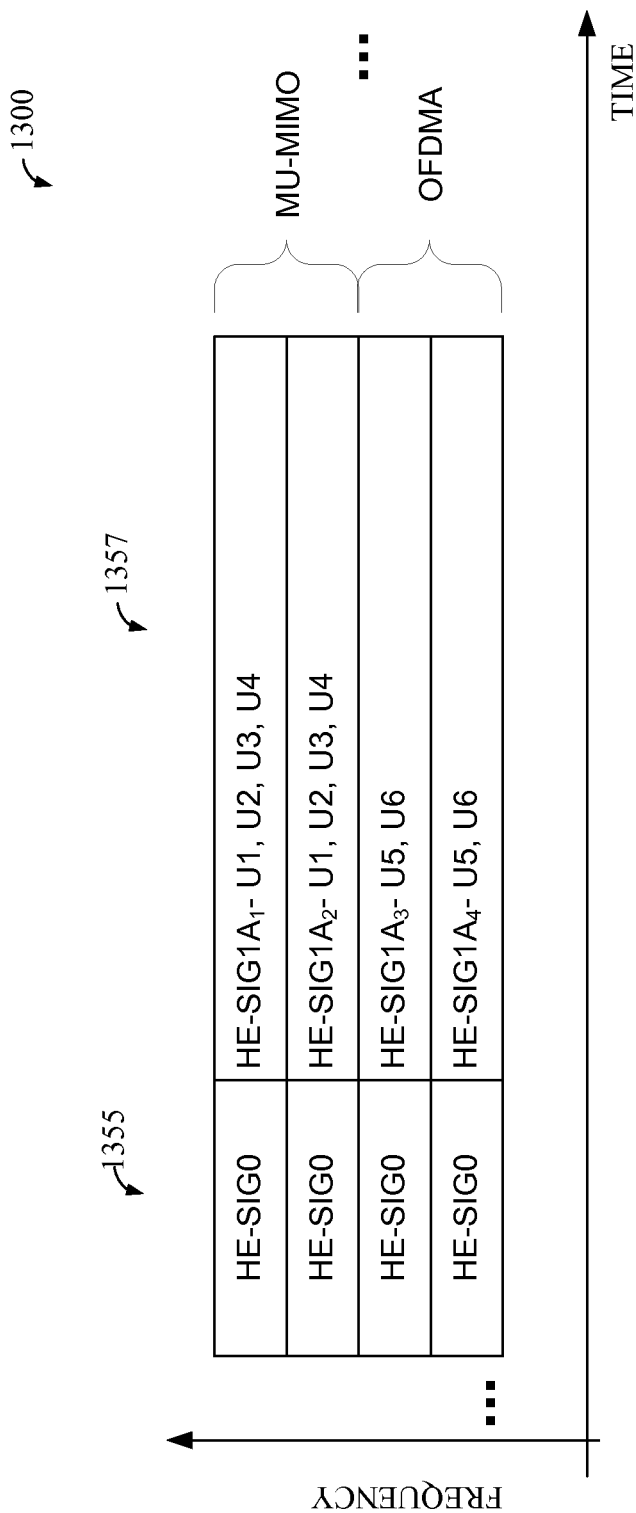
FIG. 13 illustrates portions of exemplary structures of a physical-layer packet, according to one embodiment.

FIG. 13 illustrates portions of exemplary structures of a physical-layer packet 1300, according to one embodiment. As shown in FIG. 13, the packet 1300 includes a plurality of HE-SIG0 fields 1355, each of which can be separately modulated across frequency sub-channels (but the content can be repeated). The packet 1300 further includes a single HE-SIG1 A field 1357 that can be modulated across an entire channel (or a plurality of sub-channels). In various embodiments, the packet 1300 can be similar to one or more of the packets discussed above with respect to FIGS. 4-7. For example, the HE-SIG0 fields 1355 can include one or more fields discussed above with respect to the HE-SIG0 field 455 of FIG. 7, and the HE-SIG1 field 1357 can include one or more fields discussed above with respect to the HE-SIG1 field 457 of FIG. 7. Likewise, portion of the packet 1300 shown in FIG. 13 can correspond to, for example, the HE-SIG fields 1308 shown in FIG. 1. Although the packet 1300 is described below with respect to the AP 104 and the STAs 106A-106D of the wireless system 100 of FIG. 1, the packet 1300 can be generated, decoded, transmitted, and/or received by any other device according to various embodiments. A person having ordinary skill in the art can appreciate that the illustrated physical-layer packet can include additional fields, fields can be rearranged, removed, and/or resized, and the contents of the fields varied.

In an embodiment, the AP 104 can separately encode and transmit the HE-SIG1 A fields 1357 across all sub-channels. Accordingly, the content of the HE-SIG1 A fields 1357 can be different on one or more sub-channels. In various embodiments, the AP 104 can determine one or more STAs 106 on each sub-channel, and can encode information specific to each STA 106 on the corresponding sub-channel. For example, the AP 104 can encode station-specific allocations such as group identifiers (GIDs), association identifiers (AIDs), partial AIDs (PAIDs), etc. In an embodiment, the STA 106B can receive and decode the HE-SIG1 A 1357B fields on a single (or plurality of) sub-channels. In some embodiments, STAs 106 can decode information on every sub-channel.

As discussed above, in various embodiments the AP 104 can encode an AID or PAID on each HE-SIG1 1357 in order to identify message recipients for that sub-channel. In various embodiments, for example, each HE-SIG1 1357 can include a station indication such as a 12-bit AID, a 11-bit PAID, an encoded AID (using, e.g., Huffman encoding), etc. In various embodiments, the station indication can indicate one or more STAs 106 that are recipients for an OFDMA zone. In various embodiments, there can be 4 or 8 recipients for an OFDMA zone. Accordingly, each STA 106 can determine a sub-channel allocation without the complexity of GID management.

In an embodiment, each STA 106 can decode the HE-SIG1 A 1357 on all sub-channel. Each STA 106 can determine if its station indicator is indicated on each sub-channel. For sub-channels that carry a HE-SIG1 A 1357 indicating the STA 106, the STA 106 can determine that those sub-channels are allocated to the STA 106. In various embodiments, the AP 104 can determine whether each sub-channel is clean to each destination STA 106, and can assign clean sub-channels using the station indications in the HE-SIG1 A 1357. In some embodiments, the AP 104 can encode a bit in each HE-SIG1 A 1357 to indicate whether the sub-channel on which it is transmitted is intended for MU-MIMO or OFDMA. Similarly, the STA 106 can decode the bit in each HE-SIG1 A 1357 to determine whether the sub-channel on which it is transmitted is intended for MU-MIMO or OFDMA.

In an embodiment, the AP 104 can determine one or more sub-channels for transmission to the STAs 106. For example, the AP 104 can determine that a sub-channel of a MU-MIMO zone HE-SIG1-$A_1$ is clear for stations U1, U2, U3, and U4 and that a sub-channel of an OFDMA zone HE-SIG1-$A_2$ is clear for stations U5 and U6. Accordingly, the AP 104 can encode station identifiers (such as AIDs) for U1, U2, U3, and U4 on the HE-SIG1-$A_1$, and so on. The AP 104 can repeat the allocation information across each sub-channel of for each zone, for example by encoding a common HE-SIG1 B field 1357 for adjacent zone sub-channels. Thus, although any particular STA can receive allocations on at least one sub-channel in a zone, even though it might not be capable of receiving allocations on every sub-channel.

By way of example, the AP 104 can determine that a STA U4 is in a first MU-MIMO zone. Thus, the AP 104 can encode the AID of U4 in the HE-SIG1-$A_1$ 1357, which can be duplicated across both sub-channels of the MU-MIMO zone. The STA U4 can decode every sub-channel in the HE-SIG1-A 1357. For those sub-channels in which the STA U4 is able to decode the HE-SIG1-A 1357, and in which the AID of the STA U4 is present, the STA U4 can determine that that zone carries data for it. In various embodiments, this approach can reduce management signaling and increase channel flexibility on a packet-by-packet basis In some embodiments, the AP 104 can encode the HE-SIG1-A fields 1357 over the entire bandwidth for OFDMA zones, instead of separately encoding duplicated fields over each sub-channel as illustrated. For example, the AP 104 can encode the HE-SIG1-A$_2$ 1357 across the entire bandwidth of the OFDMA zone. In some embodiments, this approach can cause an ODFMA SIG1-A field to terminate prior to a MU-MIMO HE-SIG1-A field. In other embodiments with two OFDMA zones, the SIG1-A field for both zones can terminate at the same time.

Figure 16:
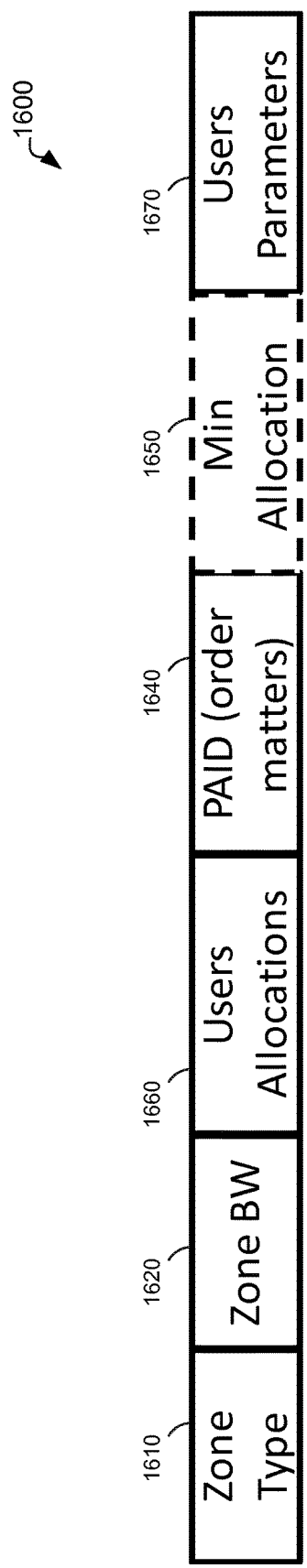
FIG. 16 shows an exemplary portion of a signal field, according to another embodiment.

As discussed above, in various embodiments, HE-SIG1 fields can be encoded across the channel bandwidth in different ways. For example, with respect to FIG. 9D, the HE-SIG1-A$_1$ 957C can be encoded with different signaling information in each sub-band (which, in the illustrated embodiment, are 20 MHz each). In contrast, with respect to FIG. 13, the HE-SIG1-A$_1$ 1357 can be encoded separately in each zone, and individual sub-bands within a zone can include the same signaling information. In any of these embodiments, HE-SIG0 field can include the same information in each sub-band. FIGS. 14-16 illustrate the contents of the HE-SIG0 and HE-SIG1 fields, according to various embodiments.

FIG. 14 shows an exemplary portion of a signal field 1400, according to one embodiment. The illustrated signal field 1400 is a SIG0 field, and can correspond to any of the HE-SIG0 field 455 (FIG. 7), the HE-SIG0 field 855 (FIG. 8), the HE-SIG0 field 955 (FIGS. 9A-9E), the HE-SIG field 1208 (FIG. 12), and the HE-SIG0 field 1355 (FIG. 13). In various embodiments, any device described herein, or another compatible device, can transmit the HE-SIG0 field 1400 such as, for example, the AP 104 (FIG. 1), a STA 106A-106D (FIG. 1), and/or the wireless device 202 (FIG. 2).

In the illustrated embodiment, the HE-SIG0 field 1400 includes a duration field 1410, a bandwidth (BW) field 1420, a PAID size indicator 1430, a BSS ID 1440, and a clear channel assessment (CCA) plus cyclic redundancy check (CRC) field 1450 (CCA+CRC). A person having ordinary skill in the art will appreciate that the HE-SIG0 field 1400 can include additional fields, and fields can be rearranged, removed, and/or resized. For example, in various embodiments, the HE-SIG0 field 1400 can additionally include a short guard interval (GI), an UL/DL indicator, etc.

The duration field 1410 serves to indicate a packet duration. The BW field 1420 serves to indicate a channel bandwidth, for example, in multiples of 20 MHz. In various embodiments, the BW field 1420 can be 2 bits long. The PAID size indicator 1430 serves to indicate a number of bits used for each PAID. In various embodiments, the PAID size indicator 1430 can be from 3-10 bits long. In various embodiments, each PAID can be from 3-10 bits long.

The BSS ID field 1440 serves to indicate an identification of the BSS. In various embodiments, the BSS ID field 1440 can be 4 bits long. In various embodiments, the BSS ID field 1440 can include an UL/DL indicator. The CCA+CRC field 1450 serves to provide a CRC and/or CCA for the packet. In various embodiments, the CCA+CRC field 1450 can be 6 bits long. In various embodiments, the HE-SIG0 field 1400 can additionally include a short guard interval (GI), which can be 1 bit long.

FIG. 15 shows an exemplary portion of a signal field 1500, according to another embodiment. The illustrated signal field 1500 is a SIG1 field, and can correspond to any of the HE-SIG1 field 457 (FIG. 7), the HE-SIG1 A field 857 (FIG. 8), the HE-SIG1 A field 957 (FIGS. 9A-9E), the HE-SIG field 1208 (FIG. 12), and the HE-SIG1-A$_1$ field 1357 (FIG. 13). In various embodiments, any device described herein, or another compatible device, can transmit the HE-SIG1 A field 1500 such as, for example, the AP 104 (FIG. 1), a STA 106A-106D (FIG. 1), and/or the wireless device 202 (FIG. 2).

In the illustrated embodiment, the HE-SIG1 A field 1500 includes a zone type field 1510, a zone bandwidth field 1520, a user count field 1530, a PAID list 1540, a minimum allocation field 1550, a user allocations field 1560, and a user parameters field 1570. A person having ordinary skill in the art will appreciate that the HE-SIG1 A field 1500 can include additional fields, and fields can be rearranged, removed, and/or resized. For example, in various embodiments, the minimum allocation field 1550 can be omitted, etc.

The zone type field 1510 serves to indicate a zone type for the transmission. In various embodiments, the zone type field 1510 can be a 1-bit flag that indicates either an OFDMA zone or a MU-MIMO zone. In various embodiments, the zone type field 1510 can indicate a zone type for a specific sub-channel or for a group of one or more sub-channels within a zone. For example, in the embodiment discussed above with respect to FIG. 9D, the zone type field 1510 in each HE-SIG1-A$_1$ 957C can indicate a zone type for the sub-channel for that HE-SIG1-A$_1$ 957C. As another example, in the embodiment discussed above with respect to FIG. 13, the zone type field 1510 in each HE-SIG1-A$_1$ 1357 can indicate a zone type for the entire zone for that HE-SIG1-A$_1$ 1357.

The zone bandwidth field 1520 serves to indicate a bandwidth for the zone transmission. In various embodiments, the zone bandwidth field 1520 can be a 3-bit field that indicates a zone bandwidth of one of: 20 MHz, 40 MHz, 60 MHz, 80 MHz, or 160 MHz. For example, in the embodiment discussed above with respect to FIG. 9D, the zone bandwidth field 1520 in each HE-SIG1-A$_1$ 957C can indicate a zone bandwidth of 40 MHz for the top OFDMA zone, and 20 MHz for the bottom two OFDMA zones. As another example, in the embodiment discussed above with respect to FIG. 13, the zone bandwidth field 1520 in each HE-SIG1-A$_1$ 1357 can indicate a zone bandwidth of 40 MHz for the MU-MIMO zone and 40 MHz for the OFDMA zone.

The user count field 1530 serves to indicate a number of users served on the sub-channel. In various embodiments, the user count field 1530 can be a 2-bit field that indicates 1-4 users per 20 MHz sub-channel. For example, in the embodiment discussed above with respect to FIG. 9D, the user count field 1530 in each HE-SIG1-A$_1$ 957C can indicate three users in the top sub-channel, two users in the next sub-channel, three users in the next sub-channel, and three users in the bottom sub-channel. As another example, in the embodiment discussed above with respect to FIG. 13, the user count field 1530 in each HE-SIG1-A$_1$ 1357 can indicate four users in each sub-channel of the MU-MIMO zone and two users in each sub-channel of the OFDMA zone.

The PAID list 1540 serves to indicate a list of users allocated to the sub-channel. In various embodiments, the PAID list 1540 can include 3-9 bits per user. In various embodiments, the PAID list 1540 can be compressed, for example where PAIDs are selected by the AP 104. In the embodiment discussed above with respect to FIG. 9D, the PAID list 1540 in each HE-SIG1-A$_1$ 957C can indicate PAIDs of users U1, U2, and U3 in the top sub-channel, users U3 and U4, in the next sub-channel, users U5, U6, and U7 in the next sub-channel, and users U8, U9, and U10 in the bottom sub-channel. As another example, in the embodiment discussed above with respect to FIG. 13, the PAID list 1540 in each HE-SIG1-A$_1$ 1357 can indicate the PAIDs of users U1-U4 in each sub-channel of the MU-MIMO zone and users U5-U6 in each sub-channel of the OFDMA zone. The PAID list 1540 can be ordered, for example to correspond with user allocations in another field.

The minimum allocation field 1550 can indicate a minimum allocation size. In various embodiments, the minimum allocation field 1550 can be a 2-bit field that indicates one of the following minimum allocation sizes: 2.5 MHz, 5 MHz, 10 MHz, or 20 MHz. In some embodiments, the minimum allocation field 1550 can be omitted, and minimum allocation sizes can be implicitly determined based on an allocation and/or a sub-channel, zone, and/or channel bandwidth.

The user allocations field 1560 can indicate bandwidth allocations to the users listed in the PAID list 1540. In various embodiments, the user allocations field 1560 can be of variable size based on the number of users N, the zone bandwidth ZBW, and the minimum allocation size MA. For example, the user allocations field 1560 can be sized according to Equation 1, below. Thus, for a 20 MHz zone, with a minimum allocation size of 5 MHz, and 3 users, the user allocations field 1560 would be 4 bits long.

$$(N-1)\log_2\left(\frac{ZBW}{MA}\right) \qquad (1)$$

In embodiments where the HE-SIG1 A field 1500 is not repeated within a zone and each sub-channel (e.g., 20 MHz) within a zone carries different HE-SIG1 information, then ZBW can be replaced with the sub-channel bandwidth. Stated another way, the zone bandwidth can be replaced with a sub-channel bandwidth in embodiments where user allocation information is not repeated across sub-channels in a zone. For example, in embodiments related to FIG. 9D, discussed above, the ZBW can refer to the sub-channel bandwidth (SCBW) rather than the full bandwidth of the zone. Thus, in some embodiments, the user allocations field 1560 can be sized according to Equation 2, below $$(N-1)\log_2\left(\frac{SCBW}{MA}\right) \qquad (1)$$

In an embodiment, the user allocations field 1560 can indicate, for each of the users in the PAID list 1540, a multiple of the minimum allocation size 1550 assigned to that user. For example, the user allocations field 1560 can indicate that the first user in the PAID list 1540 is assigned two times the minimum allocation field 1550, and that the second user in the PAID list 1540 is assigned one times the minimum allocation field 1550, and so on. In an embodiment, the user allocations field 1560 can omit the multiple for the last user in the PAID list 1540, because the last user can be implied to be allocated to the remaining bandwidth. In an embodiment, each multiple indicated in the user allocations field 1560 can indicate a sequential allocation, for example starting at the top (or bottom) of the zone.

The user parameters field 1570 can include one or more additional parameter fields such as, for example, a space time block code (STBC) of, for example, 1 bit per user, a binary convolutional coding (BCC) and/or low density parity check (LDPC) of, for example, 2 bits per user, a modulation and coding scheme (MCS) of, for example, 4 bits per user, and a number of spatial streams (NSS) of, for example, 2 bits per user. In various embodiments, the user parameters field 1570 can be of variable size, for example based on the number of users indicated in the user count field 1530.

By way of example, in one embodiment the PAID size indication 1430 of the SIG0 1400 (FIG. 14) can be 0b11, indicating a PAID size of 3 bits. The zone type field 1510 can be 0b1, indicating an OFDMA zone. The zone bandwidth field 1520 can be 0b000, indicating a 20 MHz zone. The user count field 1530 can be 0b11, indicating 3 users. The PAID list 1540 can be 0b110 010 111, indicating users U4, U2, and U7 are assigned to the sub-channel. The minimum allocation field 1550 can be 0b01, indicating that the minimum allocation size is 5 MHz. The user allocations field 1560 can be 0b01 01, indicating that user U4 is assigned the top 1 times 5 MHz in the zone, user U2 is assigned the next 1 times 5 MHz in the zone, and implicitly indicating that user U3 is assigned the remaining zone bandwidth (10 MHz).

FIG. 16 shows an exemplary portion of a signal field 1600, according to another embodiment. The illustrated signal field 1600 is a SIG1 field, and can correspond to any of the HE-SIG1 field 457 (FIG. 7), the HE-SIG1 A field 857 (FIG. 8), the HE-SIG1 A field 957 (FIGS. 9A-9E), the HE-SIG field 1208 (FIG. 12), and the HE-SIG1-A$_1$ field 1357 (FIG. 13). In various embodiments, any device described herein, or another compatible device, can transmit the HE-SIG1 A field 1600 such as, for example, the AP 104 (FIG. 1), a STA 106A-106D (FIG. 1), and/or the wireless device 202 (FIG. 2).

In the illustrated embodiment, the HE-SIG1 A field 1600 includes a zone type field 1610, a zone bandwidth field 1620, a user allocations field 1660, a PAID list 1640, a minimum allocation field 1650, and a user parameters field 1670. A person having ordinary skill in the art will appreciate that the HE-SIG1 A field 1600 can include additional fields, and fields can be rearranged, removed, and/or resized. For example, in various embodiments, the minimum allocation field 1650 can be omitted, etc.

The zone type field 1610 serves to indicate a zone type for the transmission. In various embodiments, the zone type field 1610 can be a 1-bit flag that indicates either an OFDMA zone or a MU-MIMO zone. In various embodiments, the zone type field 1610 can indicate a zone type for a specific sub-channel or for a group of one or more sub-channels within a zone. For example, in the embodiment discussed above with respect to FIG. 9D, the zone type field 1610 in each HE-SIG1-A$_1$ 957C can indicate a zone type for the sub-channel for that HE-SIG1-A$_1$ 957C. As another example, in the embodiment discussed above with respect to FIG. 13, the zone type field 1610 in each HE-SIG1-A$_1$ 1357 can indicate a zone type for the entire zone for that HE-SIG1-A$_1$ 1357.

The zone bandwidth field 1620 serves to indicate a bandwidth for the zone transmission. In various embodiments, the zone bandwidth field 1620 can be a 3-bit field that indicates a zone bandwidth of one of: 20 MHz, 40 MHz, 60 MHz, 80 MHz, or 160 MHz. For example, in the embodiment discussed above with respect to FIG. 9D, the zone bandwidth field 1620 in each HE-SIG1-A$_1$ 957C can indicate a zone bandwidth of 40 MHz for the top OFDMA zone, and 20 MHz for the bottom two OFDMA zones. As another example, in the embodiment discussed above with respect to FIG. 13, the zone bandwidth field 1620 in each HE-SIG1-A$_1$ 1357 can indicate a zone bandwidth of 40 MHz for the MU-MIMO zone and 40 MHz for the OFDMA zone.

The user count field 1530 (FIG. 15) can be omitted from the HE-SIG1 field 1600. For example, the number of users can be implicitly determined from the number of 1s in the user allocations 1660. Likewise, in various embodiments, the user count field 1530 (FIG. 15) can be omitted from the HE-SIG1 field 1500 of FIG. 15. Similarly, in various embodiments, the HE-SIG1 field 1600 can include a user count field similar or equal to the user count field 1530 described above with respect to FIG. 15.

The PAID list 1640 serves to indicate a list of users allocated to the sub-channel. In various embodiments, the PAID list 1640 can include 3-9 bits per user. In various embodiments, the PAID list 1640 can be compressed, for example where PAIDs are selected by the AP 104. In the embodiment discussed above with respect to FIG. 9D, the PAID list 1640 in each HE-SIG1-A$_1$ 957C can indicate PAIDs of users U1, U2, and U3 in the top sub-channel, users U3 and U4, in the next sub-channel, users U5, U6, and U7 in the next sub-channel, and users U8, U9, and U10 in the bottom sub-channel. As another example, in the embodiment discussed above with respect to FIG. 13, the PAID list 1640 in each HE-SIG1-A$_1$ 1357 can indicate the PAIDs of users U1-U4 in each sub-channel of the MU-MIMO zone and users U5-U6 in each sub-channel of the OFDMA zone. The PAID list 1640 can be ordered, for example to correspond with user allocations in another field.

The minimum allocation field 1650 can indicate a minimum allocation size. In various embodiments, the minimum allocation field 1650 can be a 2-bit field that indicates one of the following minimum allocation sizes: 2.5 MHz, 5 MHz, 10 MHz, or 20 MHz. In some embodiments, the minimum allocation field 1650 can be omitted, and minimum allocation sizes can be implicitly determined based on an allocation and/or a sub-channel, zone, and/or channel bandwidth.

The user allocations field 1660 can indicate bandwidth allocations to the users listed in the PAID list 1640. In various embodiments, the user allocations field 1660 can be of variable size based on the zone bandwidth ZBW and the minimum allocation size MA. For example, the user allocations field 1660 can be sized according to Equation 3, below. Thus, for a 20 MHz zone, with a minimum allocation size of 5 MHz, the user allocations field 1660 would be 4 bits long.

$$\left(\frac{ZBW}{MA}\right) \quad (3)$$

In embodiments where the HE-SIG1 A field 1600 is not repeated within a zone and each sub-channel (e.g., 20 MHz) within a zone carries different HE-SIG1 information, then ZBW can be replaced with the sub-channel bandwidth. Stated another way, the zone bandwidth can be replaced with a sub-channel bandwidth in embodiments where user allocation information is not repeated across sub-channels in a zone. For example, in embodiments related to FIG. 9D, discussed above, the ZBW can refer to the sub-channel bandwidth (SCBW) rather than the full bandwidth of the zone. Thus, in some embodiments, the user allocations field 1560 can be sized according to Equation 4, below $$\left(\frac{ZBW}{MA}\right) \quad (4)$$

In an embodiment, the user allocations field 1660 can indicate, for each of the users in the PAID list 1640, a multiple of the minimum allocation size 1650 assigned to that user. For example, the user allocations field 1660 can indicate that the first user in the PAID list 1640 is assigned two times the minimum allocation field 1650, and that the second user in the PAID list 1640 is assigned one times the minimum allocation field 1650, and so on. In an embodiment, the user allocations field 1660 can be a bitmap indicating user assignment for each minimum allocation in a zone. For example, each bit in the user allocations field 1660 can correspond to an allocation of the size indicated in the minimum allocation field 1650. Each 1 appearing in the user allocations field 1660 can correspond to a user in the PAID list 1640, and the position of each 1 can correspond to a beginning allocation to the corresponding user. Any 0s appearing after a 1 can correspond to additional allocations to the user corresponding to the previous 1. Although asserted bits are variously referred to herein as 1s, a person skilled in the art would appreciate that asserted bits can be switched with 0s herein without loss of generality.

By way of example, in one embodiment the PAID size indication 1430 of the SIG0 1400 (FIG. 14) can be 0b11, indicating a PAID size of 3 bits. The zone type field 1610 can be 0b1, indicating an OFDMA zone. The zone bandwidth field 1620 can be 0b000, indicating a 20 MHz zone. The minimum allocation field 1650 can be 0b01, indicating that the minimum allocation size is 5 MHz. The PAID list 1640 can be 0b110 010 111 001, indicating users U4, U2, U7, and U1 are assigned to the sub-channel. The user allocations field 1660 can be 0b1111. The first 1 indicates that user U4 (the first listed in the PAID list 1640) is assigned the first 5 MHz in the zone. The second 1 indicates that user U2 (the second listed in the PAID list 1640) is assigned the second 5 MHz in the zone. The third 1 indicates that user U7 (the first listed in the PAID list 1640) is assigned the third 5 MHz in the zone. The fourth 1 indicates that user U1 (the fourth listed in the PAID list 1640) is assigned the fourth 5 MHz in the zone.

In another example, the PAID list 1640 can be 0b110 010 111, indicating users U4, U2, and U7 are assigned to the sub-channel. The user allocations field 1660 can be 0b1101. The first 1 indicates that user U4 (the first listed in the PAID list 1640) is assigned the first 5 MHz in the zone. The second 1 indicates that user U2 (the second listed in the PAID list 1640) is assigned the second 5 MHz in the zone. The 0 after the second 1 indicates that user U2 (corresponding to the prior 1 in the user allocations bitmap 1660) is also assigned the third 5 MHz in the zone. The third 1 indicates that user U7 (the third listed in the PAID list 1640) is assigned the fourth 5 MHz in the zone. The fourth 1 indicates that user U1 (the fourth listed in the PAID list 1640) is assigned the fourth 5 MHz in the zone.

In another example, the PAID list 1640 can be 0b110 010, indicating users U4 and U2 are assigned to the sub-channel. The user allocations field 1660 can be 0b1100. The first 1 indicates that user U4 (the first listed in the PAID list 1640) is assigned the first 5 MHz in the zone. The second 1 indicates that user U2 (the second listed in the PAID list 1640) is assigned the second 5 MHz in the zone. The two 0's after the second 1 indicates that user U2 (corresponding to the prior 1 in the user allocations bitmap 1660) is also assigned the third and fourth 5 MHz in the zone.

In another example, the PAID list 1640 can be 0b110, indicating user U4 is assigned to the sub-channel. The user allocations field 1660 can be 0b1000. The first 1 indicates that user U4 (the first listed in the PAID list 1640) is assigned the first 5 MHz in the zone. The three 0's after the first 1 indicates that user U2 (corresponding to the prior 1 in the user allocations bitmap 1660) is also assigned the second, third, and fourth 5 MHz in the zone.

The user parameters field 1670 can include one or more additional parameter fields such as, for example, a space time block code (STBC) of, for example, 1 bit per user, a binary convolutional coding (BCC) and/or low density parity check (LDPC) of, for example, 2 bits per user, a modulation and coding scheme (MCS) of, for example, 4 bits per user, and a number of spatial streams (NSS) of, for example, 2 bits per user. In various embodiments, the user parameters field 1670 can be of variable size, for example based on the number of users indicated in the user count field 1630.

FIGS. 17-18 show exemplary sizes of a user allocations field, according to various combinations of embodiments. FIG. 17 shows exemplary sizes of the user allocations fields according to the per-sub-channel allocation scheme discussed above, for example with respect to FIG. 9D, both according to the HE-SIG1 field 1500 of FIG. 15 and the HE-SIG1 field 1600 of FIG. 16, and according to various fixed minimum allocation sizes and a dynamic minimum allocation size, and various numbers of users. FIG. 18 shows exemplary sizes of the user allocations fields according to the per-zone allocation scheme discussed above, for example with respect to FIG. 13, both according to the HE-SIG1 field 1500 of FIG. 15 and the HE-SIG1 field 1600 of FIG. 16, and according to various fixed minimum allocation sizes and a dynamic minimum allocation size, and various numbers of users.

Figure 19:
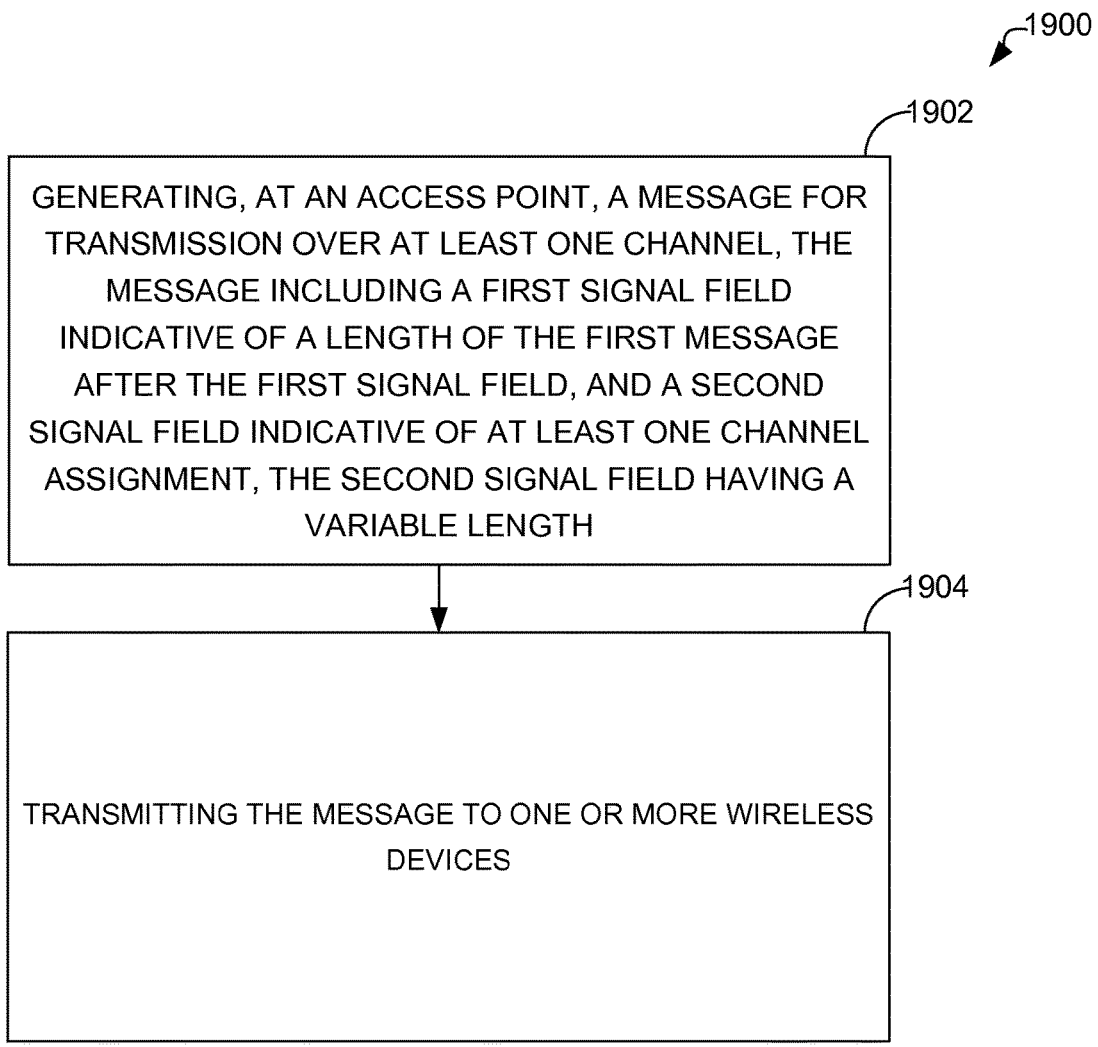
FIG. 19 shows a flowchart for an exemplary method of wireless communication that can be employed within the wireless communication system of FIG. 1.

FIG. 19 shows a flowchart 1900 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the packets 900A-900E and 13 discussed above with respect to FIGS. 9A-9E and 13, and the HE-SIG fields 1400, 1500, and 1600 discussed above with respect to FIGS. 14-16, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1902, an access point generates a message for transmission over at least one channel. For example, the AP 104 can generate, via the processor 204, a packet such as the packet 800 (FIG. 8) or 1200 (FIG. 12). The message includes a first signal field indicative of a length of the first message after the first signal field. For example, the message can include any of the HE-SIG0 fields 855, 955, 1355, and 1400. The message further includes a second signal field indicative of at least one channel assignment. For example, the message can include any of the HE-SIG1 A fields 857, 957, 1357, and 1500. The second signal field can have variable length, which can be indicated either explicitly or implicitly through several techniques. For example, it can be encoded in the first signal field. For example, the user allocations field 1560 and/or 1660 can be based on a dynamic minimum allocation size 1550 and/or 1660, or a static, fixed, stored, or pre-determined minimum allocation size.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. For example, HE-SIG0 field 1400 can include the duration field 1410, the bandwidth (BW) field 1420 the a PAID size indicator 1430, a BSS ID 1440, and/or the clear channel assessment (CCA) plus cyclic redundancy check (CRC) field 1450 (CCA+CRC) discussed above with respect to FIG. 14.

In various embodiments, the second signal field can include one or more of: a zone type, a zone bandwidth, a number of stations served, list of station identifiers, and a minimum allocation size. For example, the HE-SIG1 A field 1500 can include the zone type field 1510, the zone bandwidth field 1520, the user count field 1530, the PAID list 1540, the minimum allocation field 1550, the user allocations field 1560, and/or the user parameters field 1570 discussed above with respect to FIG. 16. As another example, the HE-SIG1 A field 1600 can include the zone type field 1610, the zone bandwidth field 1620, the PAID list 1640, the minimum allocation field 1650, the user allocations field 1660, and/or the user parameters field 1670 discussed above with respect to FIG. 16.

In various embodiments, the method can further include determining a fixed minimum allocation size. For example, in embodiments where the HE-SIG1 A field does not include a minimum allocation field, the AP 104 can retrieve a preset, predetermined, or fixed minimum allocation size from a memory. In various embodiments, the minimum allocation size can be implicitly determined from one or more of a zone bandwidth and a number of users served.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier. For example, the user allocations field 1560 can include a list of multiples corresponding to each station in the PAID list 1540, as discussed above with respect to FIG. 15.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap. For example, the user allocations field 1660 can include a bitmap indicating channel assignments corresponding to each station in the PAID list 1640, as discussed above with respect to FIG. 16.

Next, at block 1904, the access point transmits the message to one or more wireless devices. For example, the AP 104 can transmit, via the transmitter 210, the packet to any of the STAs 106. The AP 104 can transmit the packet across a channel, with certain portions duplicated between sub-channels or zones, and certain portions separately encoded, in accordance with the various embodiments discussed herein.

In an embodiment, the method shown in FIG. 19 can be implemented in a wireless device that can include a generating circuit and a transmitting circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate message. In some embodiments, the generating circuit can be configured to perform at least block 1902 of FIG. 19. The generating circuit can include one or more of the processor 204 (FIG. 2), the memory 206 (FIG. 2), and the DSP 220 (FIG. 2). In some implementations, means for generating can include the generating circuit.

The transmitting circuit can be configured to transmit the message. In some embodiments, the transmitting circuit can be configured to perform at least block 1904 of FIG. 19. The transmitting circuit can include one or more of the transmitter 210 (FIG. 2), the antenna 216 (FIG. 2), and the transceiver 214 (FIG. 2). In some implementations, means for transmitting can include the transmitting circuit.

Figure 20:
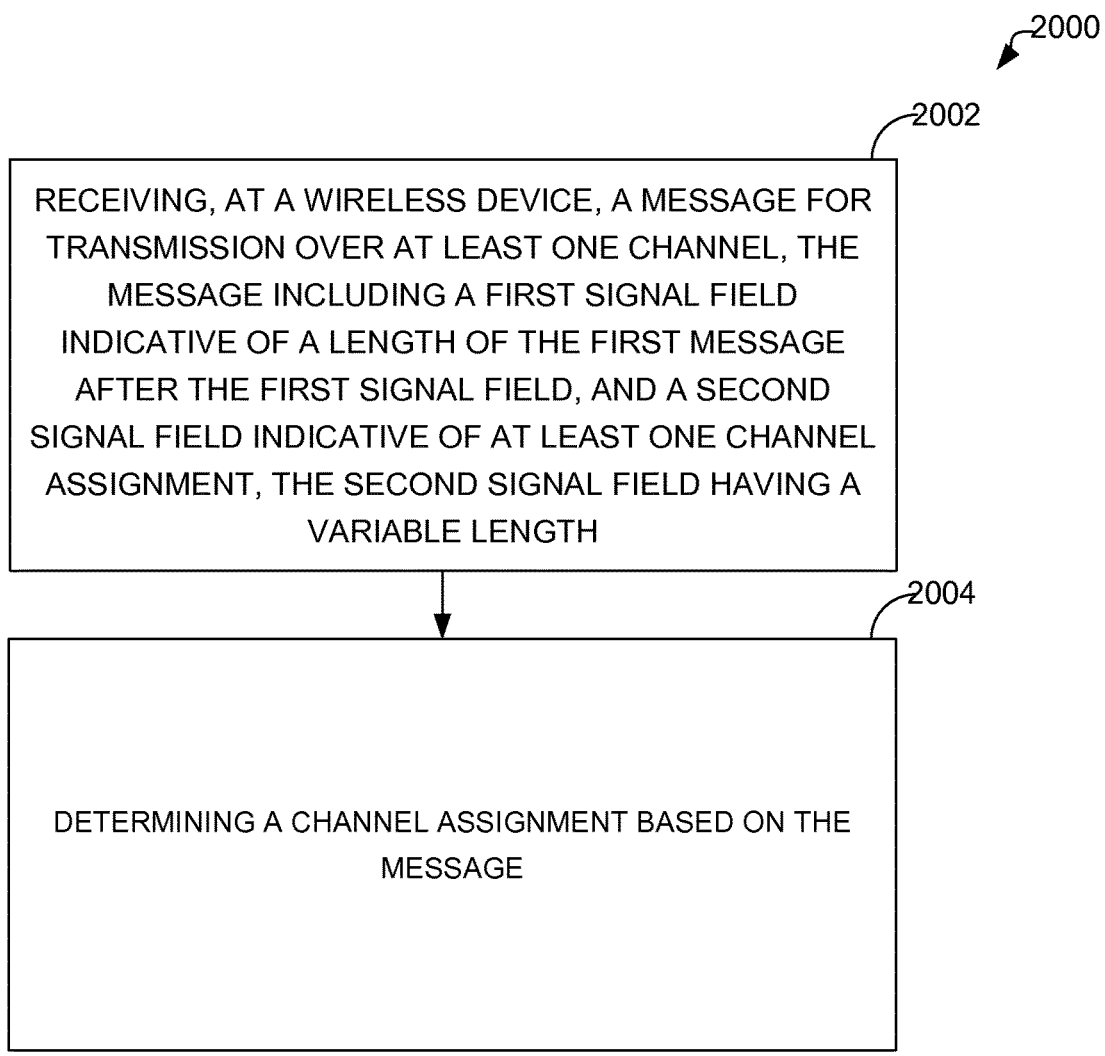
FIG. 20 shows another flowchart for an exemplary method of wireless communication that can be employed within the wireless communication system of FIG. 1.

FIG. 20 shows another flowchart 2000 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the packets 900A-900E and 13 discussed above with respect to FIGS. 9A-9E and 13, and the HE-SIG fields 1400, 1500, and 1600 discussed above with respect to FIGS. 14-16, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2002, a station receives a message over at least one channel. For example, the STA 106A can receive, via the receiver 212, a packet such as the packet 800 (FIG. 8) or 1200 (FIG. 12). The message includes a first signal field indicative of a length of the first message after the first signal field. For example, the message can include any of the HE-SIG0 fields 855, 955, 1355, and 1400. The message further includes a second signal field indicative of at least one channel assignment. For example, the message can include any of the HE-SIG1 A fields 857, 957, 1357, and 1500. The second signal field can have variable length, which can be indicated either explicitly or implicitly through several techniques. For example, it can be encoded in the first signal field. For example, the user allocations field 1560 and/or 1660 can be based on a dynamic minimum allocation size 1550 and/or 1660, or a static, fixed, stored, or predetermined minimum allocation size.

In various embodiments, the first signal field can include one or more of: a duration indication, a size indication for a station identifier, a bandwidth indication, a basic service set color identification, an uplink/downlink flag, a cyclic redundancy check, and a clear channel assessment indication. For example, HE-SIG0 field 1400 can include the duration field 1410, the bandwidth (BW) field 1420 the a PAID size indicator 1430, a BSS ID 1440, and/or the clear channel assessment (CCA) plus cyclic redundancy check (CRC) field 1450 (CCA+CRC) discussed above with respect to FIG. 14.

In various embodiments, the second signal field can include one or more of: a zone type, a zone bandwidth, a number of stations served, list of station identifiers, and a minimum allocation size. For example, the HE-SIG1 A field 1500 can include the zone type field 1510, the zone bandwidth field 1520, the user count field 1530, the PAID list 1540, the minimum allocation field 1550, the user allocations field 1560, and/or the user parameters field 1570 discussed above with respect to FIG. 16. As another example, the HE-SIG1 A field 1600 can include the zone type field 1610, the zone bandwidth field 1620, the PAID list 1640, the minimum allocation field 1650, the user allocations field 1660, and/or the user parameters field 1670 discussed above with respect to FIG. 16.

In various embodiments, the method can further include determining a fixed minimum allocation size. For example, in embodiments where the HE-SIG1 A field does not include a minimum allocation field, the STA 106A can retrieve a preset, predetermined, or fixed minimum allocation size from a memory. In various embodiments, the minimum allocation size can be implicitly determined from one or more of a zone bandwidth and a number of users served.

In various embodiments, the channel assignment can include a multiple of the minimum allocation size corresponding to at least one station identifier in the list of station identifiers. In various embodiments, the channel assignment can include a multiple of the minimum allocation size for each station identifier in the list of station identifiers, excluding a last station identifier. For example, the user allocations field 1560 can include a list of multiples corresponding to each station in the PAID list 1540, as discussed above with respect to FIG. 15.

In various embodiments, the channel assignment can include a bitmap indicating a channel assignment for each station identifier in the list of station identifiers. In various embodiments, the bitmap can include a bit corresponding to each minimum allocation within a zone bandwidth. In various embodiments, each set bit in the bitmap can indicate a channel assignment, of minimum allocation size, for a corresponding station identifier in the list of station identifiers. In various embodiments, each unset bit in the bitmap can indicate a channel assignment, of minimum allocation size, for a station identifier corresponding to a prior bit in the bitmap. For example, the user allocations field 1660 can include a bitmap indicating channel assignments corresponding to each station in the PAID list 1640, as discussed above with respect to FIG. 16.

Next, at block 2002, the wireless device determines a channel allocation based on the message. For example, the STA 106A can decode the PAID list 1540 and/or 1640 on one or more sub-channels, can determine whether a PAID associated with the STA 106A is included in the PAID list. If it is, the STA 106A can decode the user allocations 1560 and/or 1660, in conjunction with the PAID list 1540 and/or 1640 and/or the minimum allocation size 1550 and/or 1650, in order to determine one or more portions of the channel allocated to the STA 106A.

In an embodiment, the method shown in FIG. 20 can be implemented in a wireless device that can include a receiving circuit and a determining circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the message. In some embodiments, the receiving circuit can be configured to perform at least block 2002 of FIG. 20. The transmitting circuit can include one or more of the receiver 212 (FIG. 2), the antenna 216 (FIG. 2), and the transceiver 214 (FIG. 2). In some implementations, means for receiving can include the receiving circuit.

The determining circuit can be configured to determining the allocation based on the message. In some embodiments, the determining circuit can be configured to perform at least block 2002 of FIG. 20. The determining circuit can include one or more of the processor 204 (FIG. 2), the memory 206 (FIG. 2), and the DSP 220 (FIG. 2). In some implementations, means for determining can include the determining circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication comprising:
generating, at an access point, a message for transmission over at least one channel, the message comprising:
a first signal field indicative of a length of a first message after the first signal field; and
a second signal field indicative of at least one channel assignment, the second signal field having a variable length, wherein the second signal field comprises one or more of a number of stations served and a list of station identifiers, and wherein the at least one channel assignment comprises a bitmap indicating a channel assignment for each station identifier in the list of station identifiers; and
transmitting the message to one or more wireless devices.

2. The method of claim 1, wherein the first signal field comprises one or more of: a duration indication, a size indication for a station identifier, a bandwidth indication, a basic service set color identification, an uplink/downlink flag, a cyclic redundancy check, and a clear channel assessment indication.

3. The method of claim 1, wherein the second signal field comprises one or more of: a zone type, a zone bandwidth, and a minimum allocation size.

4. The method of claim 3, further comprising determining a fixed minimum allocation size.

5. The method of claim 3, wherein the at least one channel assignment comprises a multiple of the minimum allocation size corresponding to at least one station identifier in the list of station identifiers.

6. The method of claim 5, wherein the at least one channel assignment comprises a multiple of the minimum allocation size for each station identifier in the list of station identifiers, excluding a last station identifier.

7. The method of claim 1, wherein the bitmap comprises a bit corresponding to each minimum allocation within a zone bandwidth.

8. The method of claim 7, wherein each set bit in the bitmap indicates a channel assignment, of minimum allocation size, for a corresponding station identifier in the list of station identifiers.

9. The method of claim 8, wherein each unset bit in the bitmap indicates a channel assignment, of minimum allocation size, for a station identifier corresponding to a prior bit in the bitmap.

10. The method of claim 1, wherein the first message is the second signal field.

11. An apparatus configured for wireless communication comprising:
a processor configured to generate a message for transmission over at least one channel, the message comprising:
a first signal field indicative of a length of a first message after the first signal field; and
a second signal field indicative of at least one channel assignment, the second signal field having a variable length, wherein the second signal field comprises one or more of a number of stations served and a list of station identifiers, and wherein the at least one channel assignment comprises a bitmap indicating a channel assignment for each station identifier in the list of station identifiers; and
a transmitter configured to transmit the message to one or more wireless devices.

12. The apparatus of claim 11, wherein the first signal field comprises one or more of: a duration indication, a size indication for a station identifier, a bandwidth indication, a basic service set color identification, an uplink/downlink flag, a cyclic redundancy check, and a clear channel assessment indication.

13. The apparatus of claim 11, wherein the second signal field comprises one or more of: a zone type, a zone bandwidth, and a minimum allocation size.

14. The apparatus of claim 13, wherein the processor is further configured to determine a fixed minimum allocation size.

15. The apparatus of claim 13, wherein the at least one channel assignment comprises a multiple of the minimum allocation size corresponding to at least one station identifier in the list of station identifiers.

16. The apparatus of claim 15, wherein the at least one channel assignment comprises a multiple of the minimum allocation size for each station identifier in the list of station identifiers, excluding a last station identifier.

17. The apparatus of claim 11, wherein the bitmap comprises a bit corresponding to each minimum allocation within a zone bandwidth.

18. The apparatus of claim 17, wherein each set bit in the bitmap indicates a channel assignment, of minimum allocation size, for a corresponding station identifier in the list of station identifiers.

19. The apparatus of claim 18, wherein each unset bit in the bitmap indicates a channel assignment, of minimum allocation size, for a station identifier corresponding to a prior bit in the bitmap.

20. An apparatus for wireless communication comprising:
means for generating a message for transmission over at least one channel, the message comprising:
a first signal field indicative of a length of a first message after the first signal field; and
a second signal field indicative of at least one channel assignment, the second signal field having a variable length, wherein the second signal field comprises one or more of a number of stations served and a list of station identifiers, and wherein the at least one channel assignment comprises a bitmap indicating a channel assignment for each station identifier in the list of station identifiers; and
means for transmitting the message to one or more wireless devices.

21. The apparatus of claim 20, wherein the first signal field comprises one or more of: a duration indication, a size indication for a station identifier, a bandwidth indication, a basic service set color identification, an uplink/downlink flag, a cyclic redundancy check, and a clear channel assessment indication.

22. The apparatus of claim 20, wherein the second signal field comprises one or more of: a zone type, a zone bandwidth, and a minimum allocation size.

23. The apparatus of claim 22, further comprising means for determining a fixed minimum allocation size.

24. The apparatus of claim 22, wherein the at least one channel assignment comprises a multiple of the minimum allocation size corresponding to at least one station identifier in the list of station identifiers.

25. The apparatus of claim 24, wherein the at least one channel assignment comprises a multiple of the minimum allocation size for each station identifier in the list of station identifiers, excluding a last station identifier.

26. The apparatus of claim 20, wherein the bitmap comprises a bit corresponding to each minimum allocation within a zone bandwidth.

27. The apparatus of claim 26, wherein each set bit in the bitmap indicates a channel assignment, of minimum allocation size, for a corresponding station identifier in the list of station identifiers.

28. A non-transitory computer-readable medium comprising code that, when executed, causes an apparatus to:
generate a message for transmission over at least one channel, the message comprising:
a first signal field indicative of a length of a first message after the first signal field; and
a second signal field indicative of at least one channel assignment, the second signal field having a variable length, wherein the second signal field comprises one or more of a number of stations served and a list of station identifiers, and wherein the at least one channel assignment comprises a bitmap indicating a channel assignment for each station identifier in the list of station identifiers; and
transmit the message to one or more wireless devices.

\* \* \* \* \*